United States Patent
Garmark et al.

(10) Patent No.: US 11,449,221 B2
(45) Date of Patent: *Sep. 20, 2022

(54) USER INTERFACE FOR MEDIA CONTENT PLAYBACK

(71) Applicant: Spotify AB, Stockholm (SE)

(72) Inventors: Sten Garmark, Stockholm (SE); Adam Price, New York, NY (US); Daniel Choe, Brooklyn, NY (US)

(73) Assignee: Spotify AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/926,393

(22) Filed: Jul. 10, 2020

(65) Prior Publication Data

US 2020/0341632 A1    Oct. 29, 2020

Related U.S. Application Data

(63) Continuation of application No. 15/858,672, filed on Dec. 29, 2017, now Pat. No. 10,747,423.

(60) Provisional application No. 62/441,301, filed on Dec. 31, 2016.

(51) Int. Cl.
| | |
|---|---|
| *G06F 3/0482* | (2013.01) |
| *G06F 3/04883* | (2022.01) |
| *G06F 3/0485* | (2022.01) |
| *G06F 3/16* | (2006.01) |
| *G06F 3/04886* | (2022.01) |

(52) U.S. Cl.
CPC ........ *G06F 3/04883* (2013.01); *G06F 3/0485* (2013.01); *G06F 3/167* (2013.01); *G06F 3/0482* (2013.01); *G06F 3/04886* (2013.01)

(58) Field of Classification Search
None
See application file for complete search history.

(56) References Cited

U.S. PATENT DOCUMENTS

| | | |
|---|---|---|
| 7,697,917 B2 | 4/2010 | Camp, Jr. et al. |
| 8,453,186 B2 | 5/2013 | Roberts et al. |
| 8,525,012 B1 | 9/2013 | Yang |
| 8,732,193 B2 | 5/2014 | Skeen |
| 8,862,616 B2 | 10/2014 | Skeen |
| 8,875,061 B1 | 10/2014 | Lee |
| 9,207,092 B1 | 12/2015 | Yamasaki |
| 9,766,772 B2 | 9/2017 | Hunt |

(Continued)

*Primary Examiner* — Henry Orr
(74) *Attorney, Agent, or Firm* — Merchant & Gould P.C.

(57) ABSTRACT

Systems, devices, apparatuses, components, methods, and techniques for a user interface for media content playback, such as during travel, are provided. An method of media playback by a media playback device, the method comprising: playing a media content item of a selected playlist of a selected group of playlists; generating a user interface displaying a graphic associated with the media content item that is playing; when an input associated with a first dimension is received into the user interface, playing another media content item of the selected playlist; when an input associated with a second dimension is received into the user interface, playing another media content item of another selected playlist of the selected group of playlists; and when an input associated with a third dimension is received into the user interface, playing another media content item of another selected playlist of another group of playlists.

21 Claims, 21 Drawing Sheets

(56) References Cited

U.S. PATENT DOCUMENTS

| | | |
|---|---|---|
| 9,933,927 B2 | 4/2018 | Yang |
| 2002/0120925 A1 | 8/2002 | Logan |
| 2003/0093790 A1 | 5/2003 | Logan et al. |
| 2005/0154798 A1 | 7/2005 | Nurmi |
| 2006/0056806 A1 | 3/2006 | Terakado et al. |
| 2008/0030464 A1 | 2/2008 | Sohm |
| 2008/0062141 A1 | 3/2008 | Chandhri |
| 2008/0066007 A1 | 3/2008 | Lau et al. |
| 2008/0119235 A1 | 5/2008 | Nielsen |
| 2009/0012880 A1 | 1/2009 | Tortola |
| 2009/0132197 A1 | 5/2009 | Rubin |
| 2009/0300537 A1 | 12/2009 | Park |
| 2010/0010648 A1 | 1/2010 | Bull et al. |
| 2010/0060586 A1 | 3/2010 | Pisula |
| 2010/0135637 A1 | 6/2010 | McDermott et al. |
| 2010/0153844 A1 | 6/2010 | Hwang et al. |
| 2010/0229094 A1 | 9/2010 | Nakajima et al. |
| 2010/0235762 A1 | 9/2010 | Laiho et al. |
| 2011/0138331 A1* | 6/2011 | Pugsley ............... G06F 16/638 715/835 |
| 2011/0154213 A1 | 6/2011 | Wheatley et al. |
| 2011/0234480 A1* | 9/2011 | Fino ..................... F01N 3/0218 345/156 |
| 2011/0285554 A1 | 11/2011 | Aghaei et al. |
| 2011/0296351 A1 | 12/2011 | Ewing, Jr. et al. |
| 2012/0001843 A1 | 1/2012 | Gravino |
| 2012/0034904 A1 | 2/2012 | LeBeau et al. |
| 2012/0179967 A1 | 7/2012 | Hayes |
| 2012/0179970 A1 | 7/2012 | Hayes |
| 2012/0242581 A1 | 9/2012 | Laubach |
| 2012/0311444 A1 | 12/2012 | Chaudhri |
| 2012/0311500 A1* | 12/2012 | Chaudhri ............. G11B 27/105 715/835 |
| 2012/0323938 A1 | 12/2012 | Skeen |
| 2013/0063362 A1 | 3/2013 | Papakipos |
| 2013/0080968 A1* | 3/2013 | Hanson ............. H04N 5/44543 715/783 |
| 2013/0085586 A1 | 4/2013 | Parekh |
| 2013/0198677 A1 | 8/2013 | Dash |
| 2013/0205243 A1 | 8/2013 | Rivera et al. |
| 2013/0275924 A1 | 10/2013 | Weinberg |
| 2013/0317635 A1 | 11/2013 | Bates et al. |
| 2014/0035831 A1* | 2/2014 | Fino ................... G06F 3/04883 345/173 |
| 2014/0108929 A1 | 4/2014 | Garmark et al. |
| 2014/0173457 A1 | 6/2014 | Wang |
| 2014/0258553 A1 | 9/2014 | Skeen |
| 2015/0046812 A1 | 2/2015 | Darby et al. |
| 2015/0177971 A1 | 6/2015 | Jeong |
| 2016/0062567 A1 | 3/2016 | Yang et al. |
| 2016/0103589 A1 | 4/2016 | Dziuk |
| 2016/0132516 A1 | 5/2016 | Greenberg et al. |
| 2016/0162125 A1 | 6/2016 | Martella |
| 2016/0195989 A1 | 7/2016 | Czelnik |
| 2016/0306532 A1 | 10/2016 | Ko |
| 2016/0321222 A1 | 11/2016 | Greenberg |
| 2017/0010788 A1 | 1/2017 | Srinivasaraghavan |
| 2017/0060405 A1 | 3/2017 | Voss et al. |
| 2017/0220120 A1 | 8/2017 | Westbrook |
| 2017/0300216 A1 | 10/2017 | Helm |
| 2017/0337027 A1 | 11/2017 | Chen |
| 2017/0357390 A1 | 12/2017 | Ruiz |
| 2017/0357420 A1 | 12/2017 | Dye |
| 2017/0357421 A1 | 12/2017 | Dye |
| 2017/0359629 A1 | 12/2017 | Fino et al. |
| 2018/0005517 A1 | 1/2018 | Hope |
| 2018/0088896 A1 | 3/2018 | Olson |
| 2018/0188945 A1* | 7/2018 | Garmark ............. G06F 3/04883 |
| 2018/0189023 A1 | 7/2018 | Garmark et al. |
| 2018/0189226 A1 | 7/2018 | Hofverberg et al. |
| 2018/0189278 A1 | 7/2018 | Garmark |
| 2018/0191795 A1 | 7/2018 | Oskarsson et al. |
| 2018/0192285 A1 | 7/2018 | Schmidt et al. |
| 2019/0034048 A1 | 1/2019 | Gibbons |
| 2020/0125320 A1 | 4/2020 | Garmark |

* cited by examiner

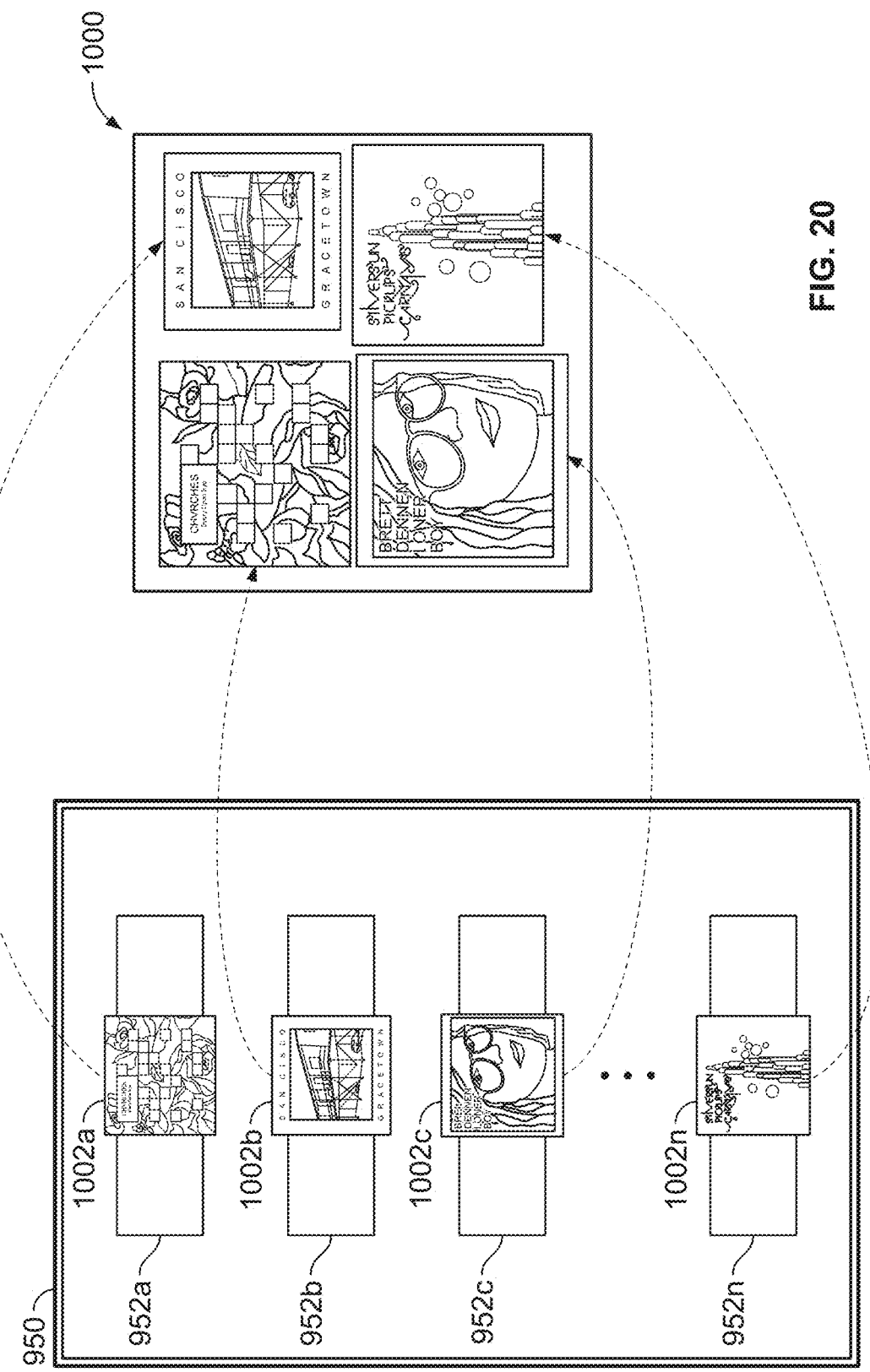

USER INTERFACE FOR MEDIA CONTENT PLAYBACK

CROSS-REFERENCE TO RELATED APPLICATIONS

This application is a Continuation of U.S. application Ser. No. 15/858,672, filed on Dec. 29, 2017, which claims the benefit of U.S. Provisional Application No. 62/441,301, filed on Dec. 31, 2016, the disclosures of which are hereby incorporated by reference in their entireties. To the extent appropriate a claim of priority is made to each of the above-disclosed applications.

BACKGROUND

Many people enjoy consuming media content while travelling or during other activities. The media content can include audio content, video content, or other types of media content. Examples of audio content include songs, albums, podcasts, audiobooks, etc. Examples of video content include movies, music videos, television episodes, etc. Using a mobile phone or other media-playback device, such as a vehicle-integrated media playback device, a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select desired media content or media content that complements a particular moment while traveling.

SUMMARY

In general terms, this disclosure is directed to media content playback for enhancing travel. In one possible configuration and by non-limiting example, a media-playback device generates a user interface that is specifically configured to enhance selection and playback of media content items during travel. Various aspects are described in this disclosure, which include, but are not limited to, the following aspects.

In a first aspect, there is a device comprising: a touch-sensitive display; a processor; and a non-transitory computer-readable medium comprising instructions. The instructions, when executed by the processor, cause the processor to: play a first media content item of a first playlist of a first group of playlists; generate a user interface displaying a graphic associated with the first media content item that is playing; responsive to receiving a tap or double tap input over the touch-sensitive display, play a next media content item or a previous media content item of the first playlist; responsive to receiving a horizontal swipe input over the touch-sensitive display, play a playlist trailer associated with a second playlist of the first group of playlists, wherein the playlist trailer comprising snippets from a plurality of media content items of the second playlist of the first group of playlists; and responsive to receiving a vertical swipe input over the touch-sensitive display, play a playlist trailer associated with a first playlist of a second group of playlists wherein the playlist trailer comprises snippets from a plurality of media content items of the first playlist of the second group of playlists.

In another aspect, there is a non-transitory computer-readable medium comprising instructions that, when executed by a processor, cause the processor to: play a first media content item of a first playlist of a first group of playlists; generate a user interface displaying a graphic associated with the first media content item that is playing; responsive to an input associated with a depth dimension being received into the user interface, play a second media content item of the first playlist; responsive to an input associated with a horizontal dimension being received into the user interface, play a media content item associated with a second playlist of the first group of playlists; and responsive to an input associated with a vertical dimension being received into the user interface, play a first media content item associated with a first playlist of a second group of playlists.

In a further aspect, there is a method of media playback by a media playback device, the method comprising: playing a first media content item of a first playlist of a first group of playlists; generating a user interface displaying a graphic associated with the first media content item that is playing; responsive to receiving an input associated with a first dimension, playing a second media content item of first playlist; responsive to receiving an input associated with a second dimension, playing a first media content item of a second playlist of the first group of playlists; and responsive to receiving an input associated with a third dimension, playing a first media content item of a first playlist of a second group of playlists.

BRIEF DESCRIPTION OF THE DRAWINGS

FIG. 20 includes a schematic diagram of a playlist and an associated playlist trailer graphical element generated by some embodiments of the media-playback system of FIG. 1.

DETAILED DESCRIPTION

Figure 1:
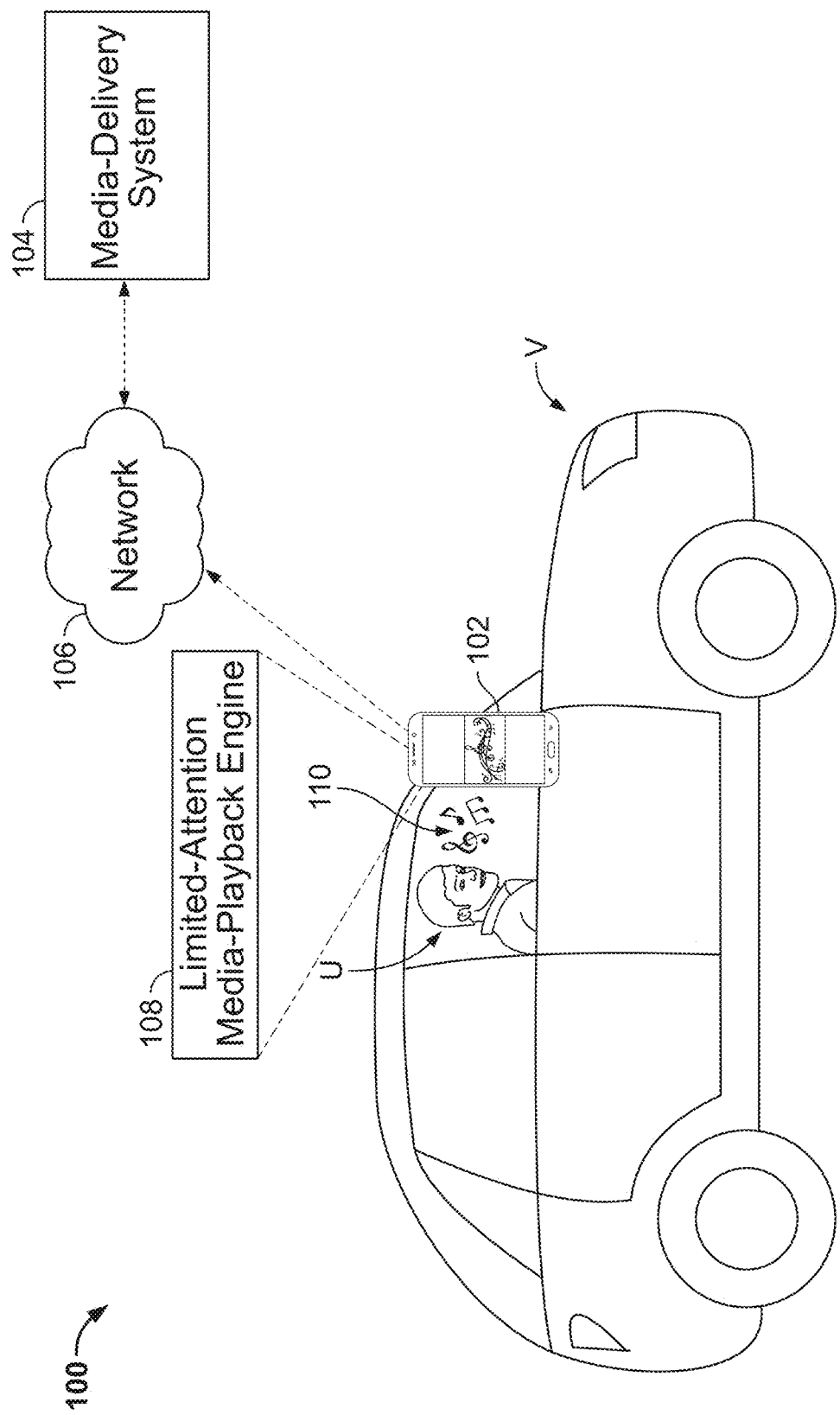
FIG. 1 illustrates an example media-playback system for media content playback during travel.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content during various activities, including travelling. As used herein, the term "travel" and variants thereof refers to any activity in which a user is in transit between two locations. For example, a user is in transit when being conveyed by a vehicle, including motorized and non-motorized, public transit and private vehicles. A user is also in transit when moving between locations by other means such as walking and running.

Enjoying media content while travelling presents many challenges. First, it can be difficult to safely interact with a media-playback device while traveling in a manner that does not interfere with travel related activities (driving, navigating, etc.). Second, desired media content may not be available or accessible in a format that can be accessed while travelling. Third, accessing media content while travelling may be difficult, expensive, or impossible depending on network availability/capacity along the route of travel. Fourth, accessing and playing back media content can require significant amounts of energy, potentially draining a battery in the media-playback device. Fifth, it can be challenging to connect a media-playback device to a vehicle-embedded audio system for playback while travelling in a vehicle. Embodiments disclosed herein address some or all of these challenges. It should be understood, however, that aspects described herein are not limited to use during travel.

For example, in some embodiments, the media-playback device includes a limited-attention interface that requires less attention from the user and/or is less distracting than a standard interface. This limited-attention interface can be useful during travel because a user may have limited attention available for interacting with a media-playback device due to the need to concentrate on travel related activities, including for example driving and navigating. But the limited-attention interface can also be configured for use playing back media content during other activities that require the user's concentration, such as exercising, playing games, operating heavy equipment, reading, studying, etc.

Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, travelling (and in particular driving) is described as one example of an activity during which media content is consumed. However, it should be understood that the same concepts are similarly applicable to other forms of media consumption and to other activities, and at least some embodiments include other forms of media consumption and/or are configured for use during other activities.

FIG. 1 illustrates an example media-playback system 100 for media content playback during travel. The example system 100 includes a media-playback device 102 and a media-delivery system 104. The media-playback device 102 includes a limited-attention media-playback engine 108. The system 100 communicates across a network 106. Also shown, is a user U who is travelling in a vehicle V.

The media-playback device 102 plays back media content items to produce media output 110. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, audiobooks, music videos, movies, television episodes, podcasts, other types of audio or video content, and portions or combinations thereof.

The media-playback device 102 plays media content for the user during travel or other activities. The media content that is played back may be selected based on user input or may be selected without user input. The media content may be selected for playback without user input by either the media-playback device 102 or the media-delivery system 104. For example, media content can be selected for playback without user input based on stored user profile information, location, travel conditions, current events, and other criteria. User profile information includes but is not limited to user preferences and historical information about the user's consumption of media content. User profile information can also include libraries and/or playlists of media content items associated with the user. User profile information can also include information about the user's relationships with other users (e.g., associations between users that are stored by the media-delivery system 104 or on a separate social media site). Although the media-playback device 102 is shown as a separate device in FIG. 1, the media-playback device 102 can also be integrated with the vehicle (e.g., as part of a dash-mounted vehicle infotainment system).

The limited-attention media-playback engine 108 generates interfaces for selecting and playing back media content items. In at least some embodiments, the limited-attention media-playback engine 108 generates interfaces that are configured to be less distracting to a user and require less attention from the user than a standard interface. Embodiments of the limited-attention media-playback engine 108 are illustrated and described further throughout.

Figure 2:
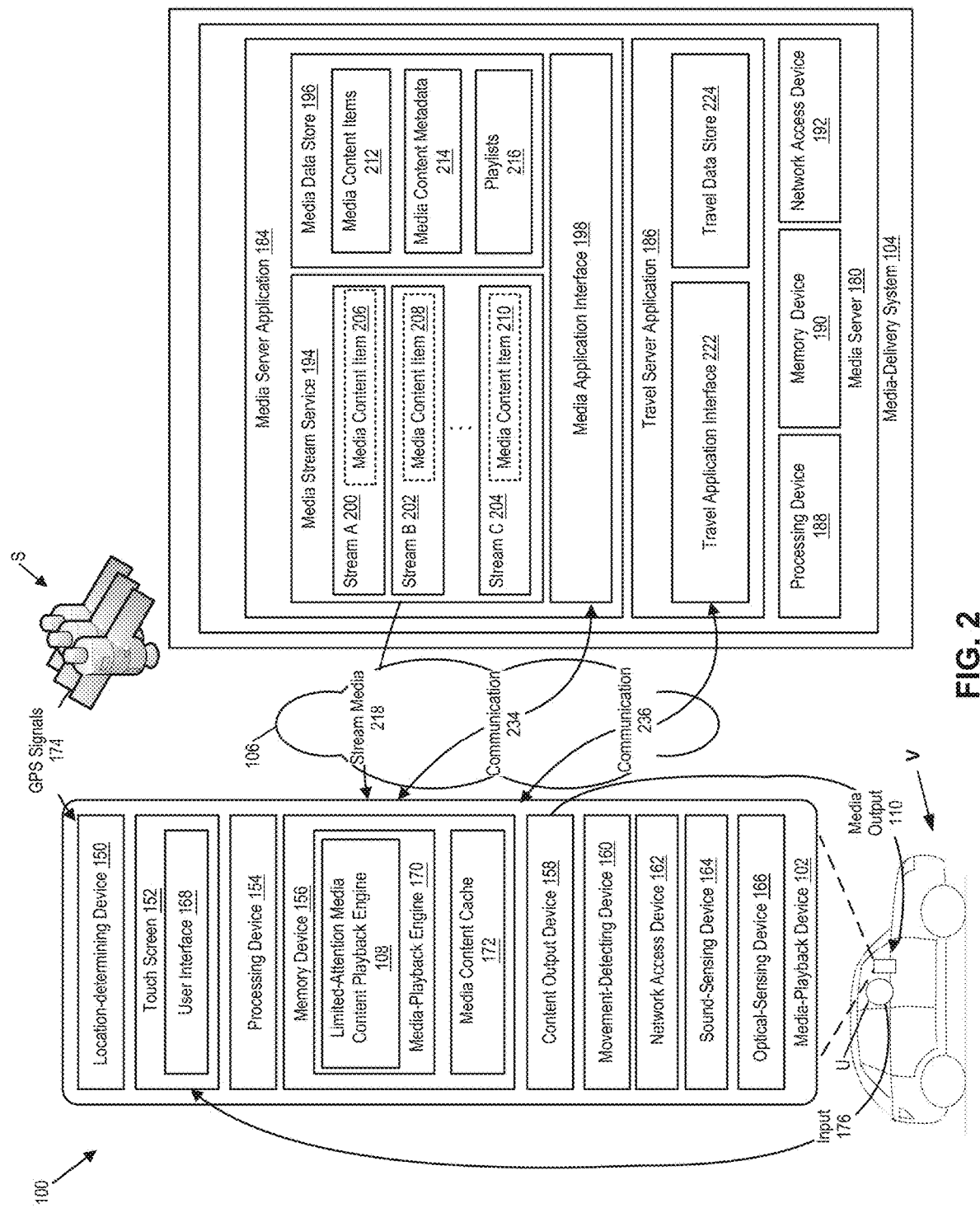
FIG. 2 is a schematic illustration of the example media-playback system of FIG. 1.

FIG. 2 is a schematic illustration of an example system 100 for media content playback during travel. In FIG. 2, the media-playback device 102, the media-delivery system 104, and the network 106 are shown. Also shown are the user U in the vehicle V, and satellites S.

As noted above, the media-playback device 102 plays media content items. In some embodiments, the media-playback device 102 plays media content items that are provided (e.g., streamed, transmitted, etc.) by a system external to the media-playback device such as the media-delivery system 104, another system, or a peer device. Alternatively, in some embodiments, the media-playback device 102 plays media content items stored locally on the media-playback device 102. Further, in at least some embodiments, the media-playback device 102 plays media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is an in-dash vehicle computer, laptop computer, desktop computer, television, gaming console, set-top box, network appliance, BLU-RAY DISC player, DVD player, media player, stereo, or radio.

In at least some embodiments, the media-playback device 102 includes a location-determining device 150, a touch screen 152, a processing device 154, a memory device 156, a content output device 158, a movement-detecting device 160, a network access device 162, a sound-sensing device 164, and an optical-sensing device 166. Other embodiments may include additional, different, or fewer components. For example, some embodiments do not include one or more of the location-determining device 150, the touch screen 152, the sound-sensing device 164, and the optical-sensing device 166.

The location-determining device 150 is a device that determines the location of the media-playback device 102. In some embodiments, the location-determining device 150 uses one or more of the following technologies: Global Positioning System (GPS) technology that may receive GPS signals 174 from satellites S, cellular triangulation technology, network-based location identification technology, wireless network technology (e.g., WI-FI) positioning systems technology, and combinations thereof.

The touch screen 152 operates to receive an input 176 from a selector (e.g., a finger, stylus, etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 168 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 170 that includes the limited-attention media-playback engine 108. In some embodiments, the media-playback engine 170 selects and plays back media content and generates interfaces for selecting and playing back media content items. As described above, the limited-attention media-playback engine 108 also generates interfaces for selecting and playing back media content items.

In at least some embodiments, the limited-attention media-playback engine 108 generates interfaces that are configured to be less distracting to a user and require less attention from the user than other interfaces generated by the media-playback engine 170. For example, interface generated by the limited-attention media-playback engine 108 may include fewer features than the other interfaces generated by the media-playback engine 170. These interfaces generated by the limited-attention media-playback engine 108 may make it easier for the user to interact with the media-playback device 102 during travel or other activities that require the user's attention.

Some embodiments of the memory device also include a media content cache 172. The media content cache 172 stores media content items, such as media content items that have been previously received from the media-delivery system 104. The media content items stored in the media content cache 172 may be stored in an encrypted or unencrypted format. The media content cache 172 can also store decryption keys for some or all of the media content items that are stored in an encrypted format. The media content cache 172 can also store metadata about media content items such as title, artist name, album name, length, genre, mood, era, etc. The media content cache 172 can also store playback information about the media content items, such as the number of times the user has requested to playback the media content item or the current location of playback (e.g., when the media content item is an audiobook, podcast, or the like from which a user may wish to resume playback).

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, BLU-RAY DISCS, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U that is directed into an interior cabin of the vehicle V. Examples of the content output device 158 include a speaker assembly comprising one or more speakers, an audio output jack, a BLUETOOTH transmitter, a display panel, and a video output jack. Other embodiments are possible as well. For example, the content output device 158 may transmit a signal through the audio output jack or BLUETOOTH transmitter that can be used to reproduce an audio signal by a connected or paired device such as headphones, speaker system, or vehicle head unit.

The movement-detecting device 160 senses movement of the media-playback device 102. In some embodiments, the movement-detecting device 160 also determines an orientation of the media-playback device 102. In at least some embodiments, the movement-detecting device 160 includes one or more accelerometers or other motion-detecting technologies or orientation-detecting technologies. As an example, the movement-detecting device 160 may determine an orientation of the media-playback device 102 with respect to a primary direction of gravitational acceleration. The movement-detecting device 160 may detect changes in the determined orientation and interpret those changes as indicating movement of the media-playback device 102. The movement-detecting device 160 may also detect other types of acceleration of the media-playback device and interpret those acceleration as indicating movement of the media-playback device 102 too.

The network access device 162 operates to communicate with other computing devices over one or more networks, such as the network 106. Examples of the network access device include one or more wired network interfaces and wireless network interfaces. Examples of wireless network interfaces include infrared, BLUETOOTH wireless technology, 802.11a/b/g/n/ac, and cellular or other radio frequency interfaces.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 106 includes various types of links. For example, the network 106 can include wired and/or wireless links, including BLUETOOTH, ultra-wideband (UWB), 802.11, ZIGBEE, cellular, and other types of wireless links. Furthermore, in various embodiments, the network 106 is implemented at various scales. For example, the network 106 can be implemented as one or more vehicle are networks, local area networks (LANs), metropolitan area networks, subnets, wide area networks (such as the Internet), or can be implemented at another scale. Further, in some embodiments, the network 106 includes multiple networks, which may be of the same type or of multiple different types.

The sound-sensing device 164 senses sounds proximate the media-playback device 102 (e.g., sounds within a vehicle in which the media-playback device 102 is located). In some embodiments, the sound-sensing device 164 comprises one or more microphones. For example, the sound-sensing device 164 may capture a recording of sounds from proximate the media-playback device 102. These recordings may be analyzed by the media-playback device 102 using speech-recognition technology to identify words spoken by the user. The words may be recognized as commands from the user that alter the behavior of the media-playback device 102 and the playback of media content by the media-playback device 102. The words and/or recordings may also be analyzed by the media-playback device 102 using natural language processing and/or intent-recognition technology to determine appropriate actions to take based on the spoken words. Additionally or alternatively, the sound-sensing device may determine various sound properties about the sounds proximate the user such as volume, dominant frequency or frequencies, etc. These sound properties may be used to make inferences about the environment proximate to the media-playback device 102 such as whether the sensed sounds are likely to correspond to a private vehicle, public transportation, etc. In some embodiments, recordings captured by the sound-sensing device 164 are transmitted to media-delivery system 104 (or another external server) for analysis using speech-recognition and/or intent-recognition technologies.

The optical-sensing device 166 senses optical signals proximate the media-playback device 102. In some embodiments, the optical-sensing device 166 comprises one or more light sensors or cameras. For example, the optical-sensing device 166 may capture images or videos. The captured images can be processed (by the media-playback device 102 or an external server such as the media-delivery system 104 to which the images are transmitted) to detect gestures, which may then be interpreted as commands to change the playback of media content. Similarly, a light sensor can be used to determine various properties of the environment proximate the user computing device, such as the brightness and primary frequency (or color or warmth) of the light in the environment proximate the media-playback device 102. These properties of the sensed light may then be used to infer whether the media-playback device 102 is in an indoor environment, an outdoor environment, a private vehicle, public transit, etc.

The media-delivery system 104 comprises one or more computing devices and provides media content items to the media-playback device 102 and, in some embodiments, other media-playback devices as well. The media-delivery system 104 includes a media server 180. Although FIG. 2 shows a single media server 180, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel or other activities, etc.). Various combinations thereof are possible as well.

The media server 180 transmits stream media 218 to media-playback devices such as the media-playback device 102. In some embodiments, the media server 180 includes a media server application 184, a travel server application 186, a processing device 188, a memory device 190, and a network access device 192. The processing device 188, memory device 190, and network access device 192 may be similar to the processing device 154, memory device 156, and network access device 162 respectively, which have each been previously described.

In some embodiments, the media server application 184 streams music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media-playback engine 170.

In some embodiments, the media data store 196 stores media content items 212, media content metadata 214, and playlists 216. The media data store 196 may comprise one or more databases and file systems. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The travel server application 186 provides travel-specific functionality for providing media content items and interfaces for accessing media content items to media-playback devices. In some embodiments, the travel server application 186 includes a travel application interface 222 and a travel data store 224.

The travel application interface 222 can receive requests or other communication from media-playback devices or other systems, to retrieve travel information and media content items for playback during travel. For example, in FIG. 2, the travel application interface 222 receives communication 236 from the media-playback engine 170.

The travel application interface 222 can also generate interfaces that are transmitted to the media-playback device 102 for use by the limited-attention media-playback engine 108. In some embodiments, the travel application interface 222 generates limited-attention interfaces by modifying other interfaces to identify (e.g., with tags) user interface elements that behave differently or should be rendered differently on a limited-attention interface.

Additionally, the travel server application 186 can process data and user input information received from the media-playback device 102. In some embodiments, travel server application 186 operates to transmit information about the suitability of one or more media content items for playback during travel. In some embodiments, the travel server application 186 may provide a list of media content items that are suited to particular geographic locations, travel conditions, modes of travel, user preferences, etc.

For example, the travel server application 186 may store metadata and other information that associates media content items with geographic locations, forms of travel, travel conditions, etc. in the travel data store 224. The travel server application 186 may also store information that associates media content items with an individual's or a group of users' preferences for consuming that media content during travel in the travel data store 224. The travel data store 224 may comprise one or more files or databases. The travel data store 224 can also comprise files, tables, or fields in the media data store 196.

In some embodiments, the travel data store 224 stores travel media metadata. The travel media metadata may include various types of information associated with media content items, such as the media content items 212. In some embodiments, the travel data store 224 provides information that may be useful for selecting media content items for playback during travel. For example, in some embodiments, the travel data store 224 stores travel scores for media content items that correspond to the suitability of particular media content items for playback during travel. As another example, in some embodiments, the travel data store 224 stores timestamps (e.g., start and end points) that identify portions of media content items that are particularly well-suited for playback during travel (or other activities).

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for media playback during travel, other embodiments are possible as well. For example, in some embodiments, the media-playback device 102 includes a media data store 196 and the media-playback device 102 is configured to select and playback media content items without accessing the media-delivery system 104. Further in some embodiments, the media-playback device 102 operates to store previously streamed media content items in a local media data store (e.g., the media content cache 172).

In at least some embodiments, the media-delivery system 104 can be used to stream, progressively download, or otherwise communicate music, other audio, video, or other forms of media content items to the media-playback device 102 for playback during travel on the media-playback device 102. In accordance with an embodiment, a user U can direct input 176 to the user interface 168 to issue requests, for example, to playback media content for playback during travel on the media-playback device 102.

Figure 3A:
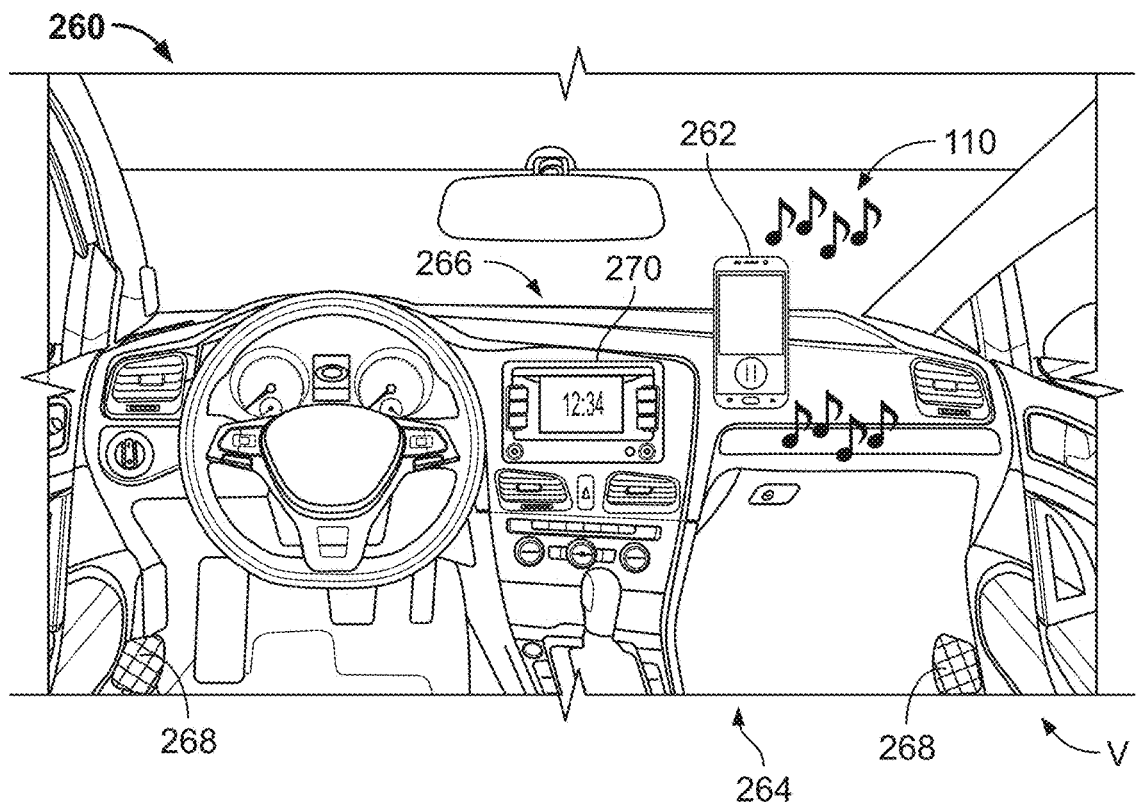
FIG. 3A is a schematic diagram of an embodiment of the media-playback system of FIG. 1.

FIG. 3A is a schematic diagram of an embodiment of a media-playback system 260 shown within an interior cabin of the vehicle V. The media-playback system 260 is an example of the media-playback system 100.

In this example, the media-playback system 260 includes a media-playback device 262. The media-playback device 262 is an embodiment of the media-playback device 102. Although not shown in this figure, some embodiments of the media-playback system 260 also include a media-delivery system such as the media-delivery system 104.

Also shown in this figure, is a vehicle media-playback system 264. The vehicle media-playback system 264 is capable of generating media output 110 within the interior cabin of the vehicle V. An example of the vehicle media-playback system 264 is illustrated and described with respect to FIG. 4.

As shown in FIG. 3A, the vehicle media-playback system 264 includes a vehicle head unit 266 and a speaker assembly 268. The vehicle head unit 266 receives or generates media content signals from one or more sources. As shown in FIG. 2, the vehicle head unit 266 includes a display device 270, which can be used to display information about the selected or available sources of media content. In some embodiments, the display device 270 can also display media content. Typically, the vehicle head unit 266 also includes a user input assembly that is usable to control the vehicle media-playback system 264 and to select a source of media content. The vehicle head unit 266 then transmits those signals to output devices such as the speaker assembly 268 (sometimes via an amplifier). In some embodiments, the vehicle head unit 266 also generates image or video content signals that can be transmitted to the display device 270 or another device for display.

In FIG. 3A, the vehicle media-playback system 264 is not being used to generate media output. Instead, the media-playback device 262 is generating media output 110 directly (e.g., through a speaker or other content output device of the media-playback device 262).

Figure 3B:
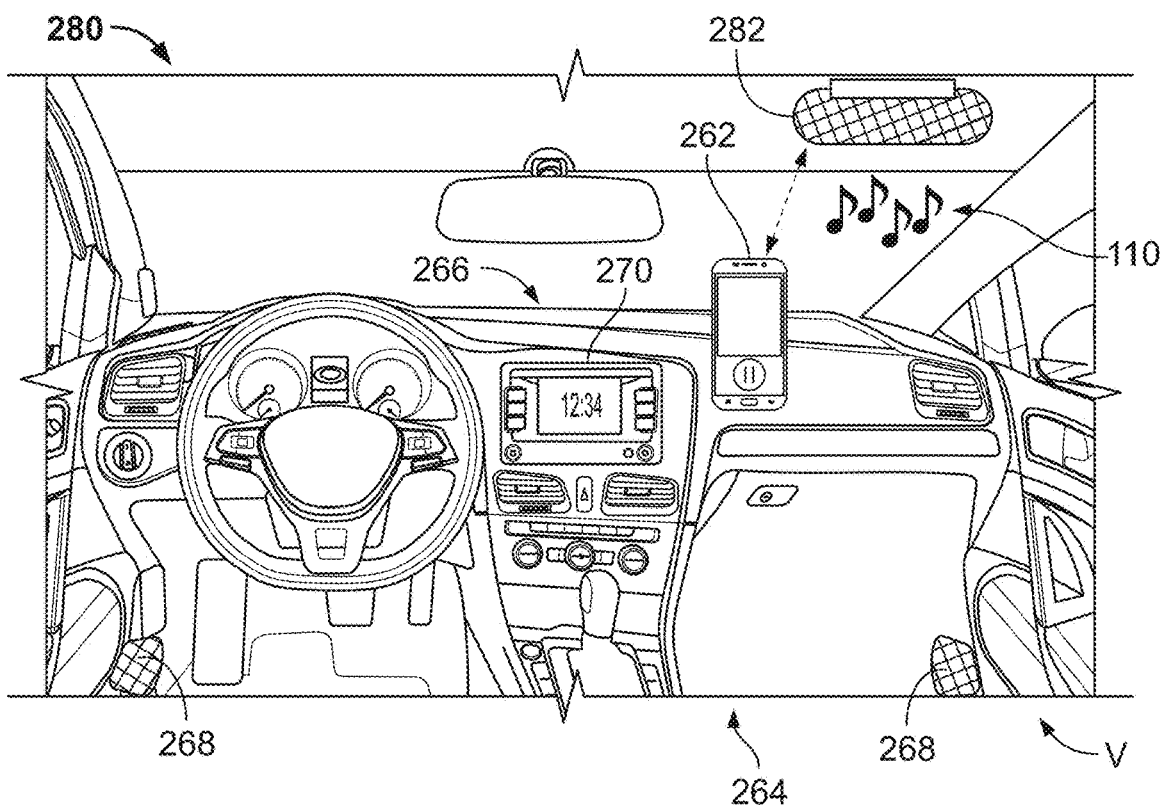
FIG. 3B is a schematic diagram of another embodiment of the media-playback system of FIG. 1.

FIG. 3B is a schematic diagram of an embodiment of a media-playback system 280. The media-playback system 280 is an example of the media-playback system 100. The media-playback system 280 includes the media-playback device 262 and an external speaker assembly 282. The vehicle media-playback system 264 is also shown in FIG. 3B.

The external speaker assembly 282 generates media output 110 based on a signal received from the media-playback device 262. The external speaker assembly 282 can include one or more speakers. The external speaker assembly 282 can also include a mechanical apparatus for attachment to the vehicle. Although alternatives are possible, in FIG. 3B, the external speaker assembly 282 is attached to a sun visor of the vehicle.

In some embodiments, the media-playback device 262 connects to the external speaker assembly 282 using BLUETOOTH. The media-playback device 262 then transmits an audio signal to the external speaker assembly 282 via BLUETOOTH, which is then used by the external speaker assembly 282 to generate the media output 110. In some embodiments, the media-playback device 262 and the external speaker assembly 282 communicate using a different wireless protocol. Further, in some embodiments, the media-playback device 262 can transmit a media content signal to the external speaker assembly 282 via a cable (e.g., an analog or digital audio cable, a universal serial bus (USB) cable).

In FIG. 3B, the vehicle media-playback system 264 is not being used to generate media output. Instead, the media-playback device 262 is transmitting a signal to the external speaker assembly 282, which generates the media output 110 without using the vehicle media-playback system 264.

Figure 3C:
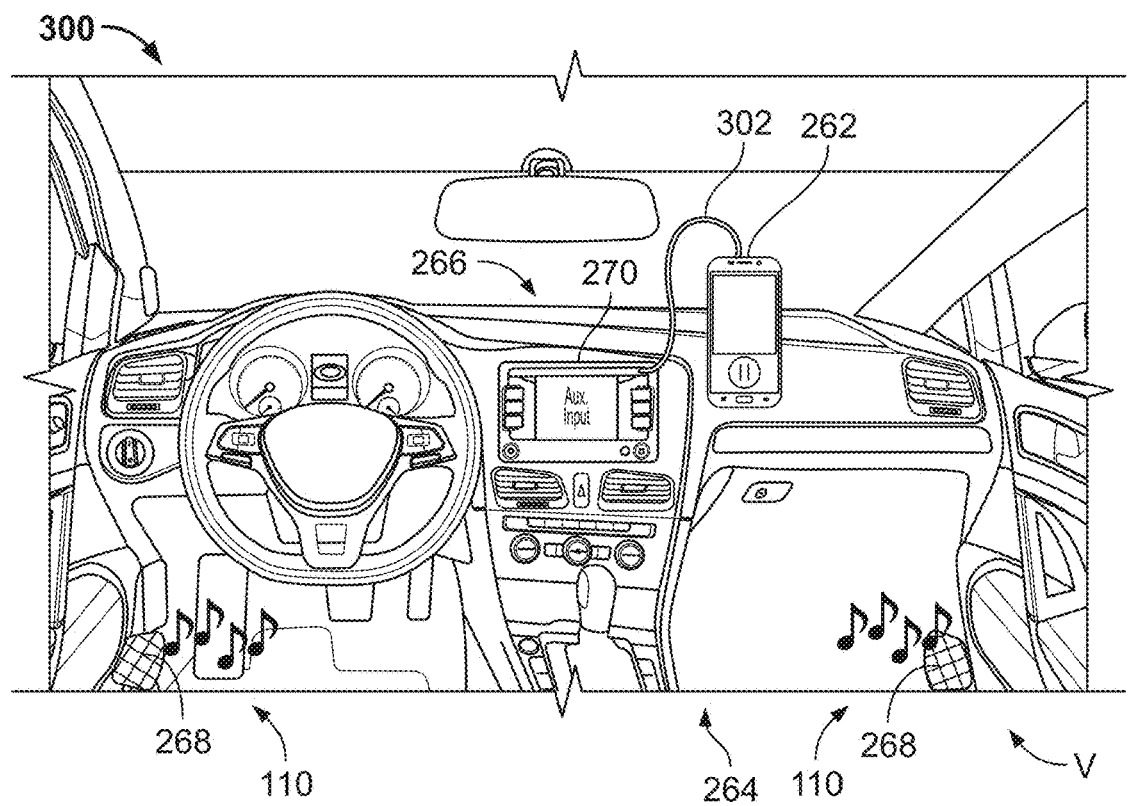
FIG. 3C is a schematic diagram of another embodiment of the media-playback system of FIG. 1.

FIG. 3C is a schematic diagram of an embodiment of a media-playback system 300. The media-playback system 300 is an example of the media-playback system 100. The media-playback system 300 includes the media-playback device 262, the vehicle media-playback system 264, and a cable 302.

The cable 302 connects the media-playback device 262 to the vehicle media-playback system 264. Although alternatives are possible, the cable 302 can be an analog audio cable that is connects an audio output device of the media-playback device 262 (e.g., a headphone jack) to a wired input device of the vehicle media-playback system 264 (e.g., an auxiliary input jack). In alternative embodiments, the cable 302 is a USB cable that connects the media-playback device 262 to the vehicle media-playback system 264.

As shown in FIG. 3C, the display device 270 indicates that the vehicle media-playback system 264 is generating media output 110 based on a signal received from an auxiliary input. The media output 110 is played within the interior cabin of the vehicle by the vehicle media-playback system 264 using the speaker assembly 268.

Figure 3D:
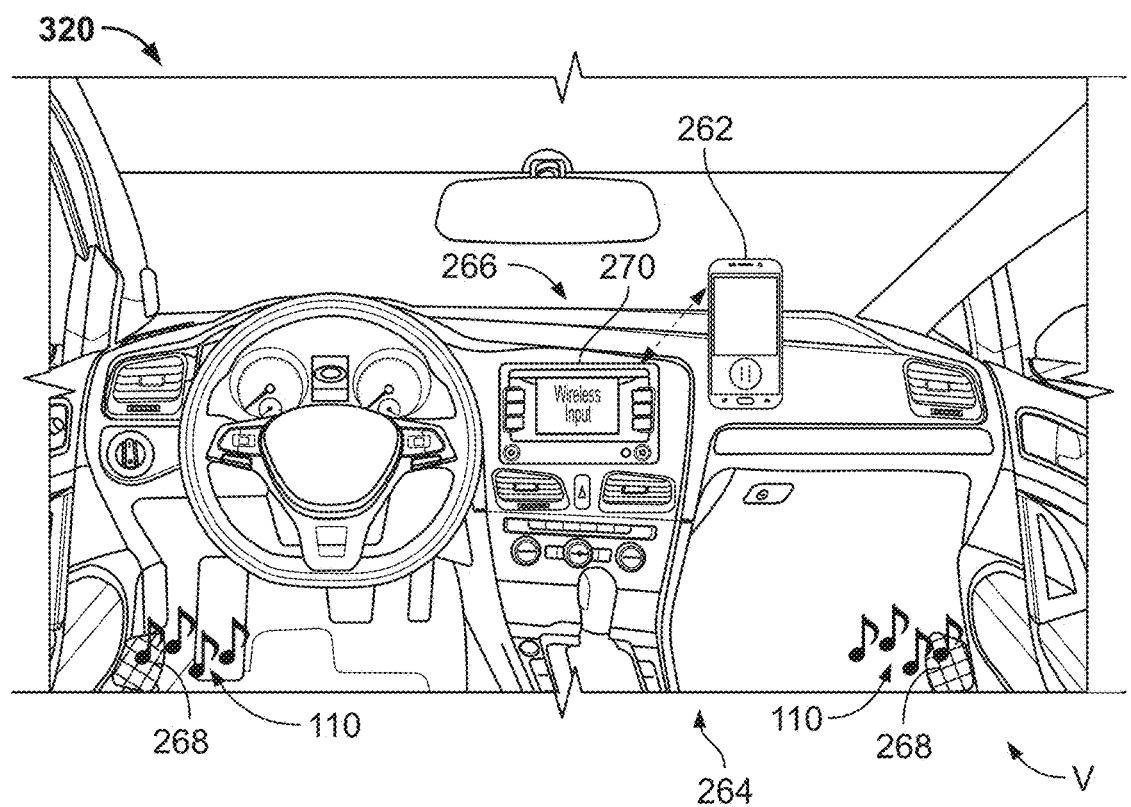
FIG. 3D is a schematic diagram of another embodiment of the media-playback system of FIG. 1.

FIG. 3D is a schematic diagram of an embodiment of a media-playback system 320. The media-playback system 320 is an example of the media-playback system 100. The media-playback system 320 includes the media-playback device 262 and the vehicle media-playback system 264. In this example, the media-playback device 262 and the vehicle media-playback system 264 are connected using a wireless communication protocol. Although alternatives are possible, the media-playback device 262 and the vehicle media-playback system 264 can be connected using BLUETOOTH. As an alternative, the media-playback device 262 and the vehicle media-playback system 264 can be connected via a WI-FI network (e.g., using an 802.11 wireless communication protocols) or another type of wireless connection.

As shown in FIG. 3D, the display device 270 indicates that the vehicle media-playback system 264 is generating media output 110 based on a signal received from a wireless input. The media output 110 is played within the interior cabin of the vehicle by the vehicle media-playback system 264 using the speaker assembly 268.

Figure 4:
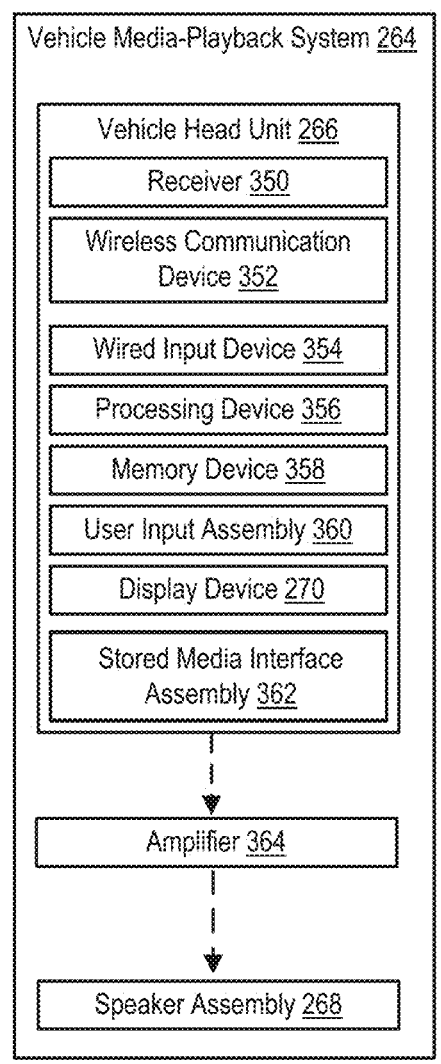
FIG. 4 is a schematic diagram of an embodiment of the vehicle media-playback system of FIG. 3A.

FIG. 4 is a schematic diagram of an embodiment of the vehicle media-playback system 264. In this example, the vehicle media-playback system 264 includes a vehicle head unit 266, an amplifier 364, and a speaker assembly 268.

The vehicle head unit 266 received user input and generates media content from various sources. In this example, the vehicle head unit 266 includes a receiver 350, a wireless communication device 352, a wired input device 354, a processing device 356, a memory device 358, a user input assembly 360, a display device 270, and a stored media interface assembly 362. The processing device 356 may be similar to the processing device 154 and the memory device 358 may be similar to the memory device 156.

The receiver 350 receives media content signals from various external sources. The received signals can then be used to generate media output by the vehicle media-playback system 264. The receiver 350 may comprise one or more tuners for receiving radio signals such as FM or AM radio signals. Additionally, the receiver 350 may comprise a receiver for receiving satellite radio signals.

The wireless communication device 352 communicates with other devices using wireless data signals. The wireless communication device 352 can include one or more of a BLUETOOTH transceiver and a WI-FI transceiver. The wireless data signal may comprise a media content signal such as an audio or video signal.

The wired input device 354 receives a cable for providing media content and/or commands. In some embodiments, the wired input device 354 can include an auxiliary input jack for receiving a plug that transmits an analog audio signals. The wired input device 354 can also include different or multiple input jacks for receiving plugs that transmit other types of analog or digital signals (e.g., USB, HDMI, composite video, YPbPr, DVI). In some embodiments, the wired input device 354 is also used to receive instructions from other devices.

The user input assembly 360 comprises one or more input devices for providing user input to the vehicle media-playback system 264. In some embodiments, the user input assembly 360 includes multiple knobs, buttons, and other types of input controls for adjusting volume, selecting sources and content, and adjusting various output parameters. In some embodiments, the various input devices are disposed on or near a front surface of the vehicle head unit 266. The various input devices can also be disposed on the steering wheel of the vehicle or elsewhere. Additionally or alternatively, the user input assembly 360 can include one or more touch sensitive surfaces, which can be incorporated in the display device 270.

The display device 270 displays information. In some embodiments, the display device 270 includes a liquid crystal display (LCD) panel for displaying textual information about content and/or settings of the vehicle media-playback system 264. The display device 270 can also include other types of display panels such as a light emitting diode (LED) panel. In some embodiments, the display device 270 can also display image or video content.

The stored media interface assembly 362 reads media content stored on a physical medium. In some embodiments, the stored media interface assembly 362 comprises one or more devices for reading media content from a physical medium such as a compact disc or cassette tape.

The amplifier 332 amplifies a signal received from the vehicle head unit 266 and transmits the amplified signal to the speaker assembly 268. In this manner, the media output 110 can be played back at a greater volume. The amplifier 332 may include a power source to power the amplification.

The speaker assembly 268 produces an audio output based on an electronic signal. The speaker assembly may comprise one or more speakers disposed at various locations within the vehicle. In some embodiments, separate signals are received for at least some of the speakers (e.g., to provide stereo or surround sound).

Figure 5:
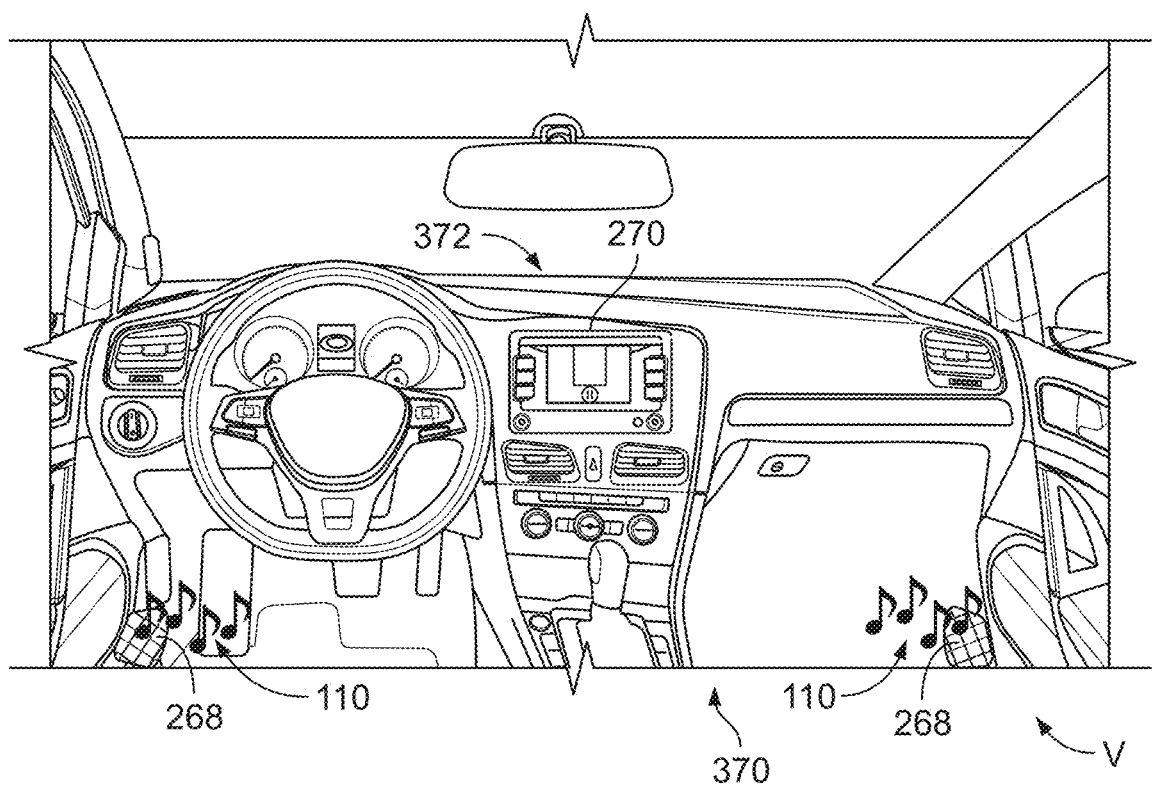
FIG. 5 is a schematic diagram of an embodiment of a vehicle media-playback system that incorporates a media-playback device.

FIG. 5 is a schematic diagram of an embodiment of a vehicle media-playback system 370 that incorporates a media-playback device. The vehicle media-playback system 370 is an example of the media-playback system 100. The vehicle media-playback system 370 includes a vehicle head unit 372 and the speaker assembly 268. In this example, the vehicle head unit 372 incorporates the components and functionality of both a media-playback device such as the media-playback device 102 and a vehicle head unit such as the vehicle head unit 266. As shown in FIG. 5, the display device 270 is showing a user interface screen for selecting and playing back media content, which can, for example, be generated by the limited-attention media-playback engine 108. The media output 110 is played within the interior cabin of the vehicle by the vehicle media-playback system 370 using the speaker assembly 268. Although alternatives are possible, the vehicle media-playback system 370 often also includes navigation, climate control, and vehicle maintenance capabilities too.

Figure 6:
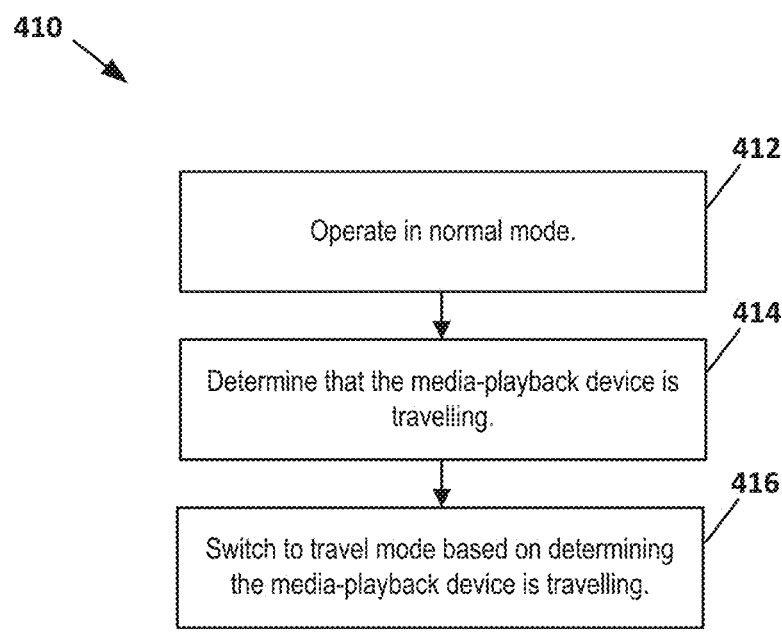
FIG. 6 illustrates an example method of media content playback during travel performed by some embodiments of the media-playback device of FIG. 1.

FIG. 6 illustrates an example method 410 of media content playback during travel performed by some embodiments of the media-playback device 102.

At operation 412, the media-playback device 102 operates in a normal mode. For example, in the normal mode user interfaces that are feature rich and include many options that may be generated and displayed. The user interfaces generated in normal mode may include user-actuatable elements that allow the user to select media content items from large catalogs/lists, search for media content items, curate playlists of media content items, download media content items, adjust playback settings, and many other features.

At operation 414, it is determined that the media-playback device is travelling. Although alternatives are possible, it can be determined that the media-playback device is travelling based on connecting to a vehicle media-playback system (e.g., via BLUETOOTH or an audio output port). In some embodiments, the media-playback device determines that it is connected to a vehicle media-playback system based on a BLUETOOTH-device identifier associated with a device to which it is connected device. In some embodiments, the media-playback device determines that it is travelling based on detecting the movement of the media-playback device (e.g., based on the location-determining device and/or the movement-detecting device). For example, some embodiments determine that media-playback device is travelling when the movement-detecting device detects an acceleration that exceeds a pre-determined threshold. Similarly, some embodiments determine that the media-playback device is travelling based on determining that media-playback device is a moving at a speed that exceeds a predetermined threshold (e.g., as determined by a series of measurements by the movement determining device).

Other techniques can be used to determine whether the media-playback device is traveling. These can include one or more techniques described in the following applications, the entireties of which were previously incorporated by reference: U.S. Provisional Patent Application No. 62/441,257, filed on Dec. 31, 2016, entitled "Media Content Playback with State Prediction and Caching"; U.S. Provisional Patent Application No. 62/441,323, filed on Dec. 31, 2016, entitled "Vehicle Detection for Media Content Player Connected to Vehicle Media Content Player"; and U.S. Provisional Patent Application No. 62/441,263, filed on Dec. 31, 2016, entitled "Vehicle Detection for Media Content Player".

At operation 416, the media-playback device switches to a travel mode based on determining that the media-playback device is travelling. The travel mode may comprise a simplified user interface that is optimized for swipes and voice interaction. In some embodiments, when the media-playback device switches to travel mode a limited-attention user interface is generated. For example, the limited-attention user interface may include fewer user interface elements than the interface that is provided in normal mode. Additionally, the user interface elements that are included in the limited-attention user interface may be larger or otherwise simpler for a user to interact with.

In at least some embodiments, the limited-attention user interface includes a limited set of user interface elements that are related to selecting and playing-back media content. For example, the limited-attention user interface may include commands to skip the currently playing media content item. Additionally, embodiments of the limited-attention user interface include commands to return to a most recently played previous media-content item.

Some embodiments also include user interface elements or are receptive to inputs that switch to a different playlist or group of playlists. For example, some embodiments are configured to switch playlists with a list of playlists based on user input that is a swipe to the left or right on the touchscreen (e.g., the list of playlists may be but do not need to be related to a particular genre, theme, era, or any other grouping, the list of playlists can also be generated based on a user's recent interactions with the media-playback device such as recently played, created, or accessed playlists). Additionally, some embodiments are configured to switch to a different group of playlists based on a user input that is a swipe up or down on the touchscreen.

In some embodiments, upon entering travel mode the media-playback device begins playing back media content without any further user input (e.g., by resuming playback of a recently played media content item or playlist). In this manner, a user is not required to interact with the media-playback device at all to being playback when the media-playback device is operating in travel mode.

Additionally, in some embodiments, the media playback device generates an audio output that describes the currently playing media content item (e.g., the name of one or more of the currently playing playlist, media content item, artist). The audio output may be generated using text-to-speech technology based on metadata associated with the media content item. However, in some embodiments, the audio output is generated by playing a recording that includes a description (e.g., a recording by the artist, a disc jockey, or a playlist creator).

When operating in travel mode, some embodiments of the media-playback device can receive and respond to voice commands from users. For example, the media-playback device may listen for a certain keyword/phrase (e.g., "Hey Spotify") that users utter before speaking a command. The user's speech that follows the keyword/phrase is then recorded and processed (either locally or remotely) to determine an action desired by the user. Some embodiments support a limited set of keyword voice commands (e.g., "skip song," "next playlist," "pause," "play,"). Additionally, some embodiments include intent recognition technology that attempts to determine a user's intended command based on an unstructured spoken utterance from the user.

Some embodiments also activate an optical-sensing device (e.g., a camera) on the media-playback device in travel mode to capture user input gestures. For example, some embodiments are configured to interpret a side to side wave in front of the media-playback device as a skip command, while an up-and-down wave may be interpreted as a switch groups of playlists command. For example; the input gestures can be recognized using a motion recognition engine from a motion tracking system like the system developed by CRUNCHFISH Ab of Malmö, Sweden, or the KINECT system from MICROSOFT of Redmond, Wash.

Figure 7:
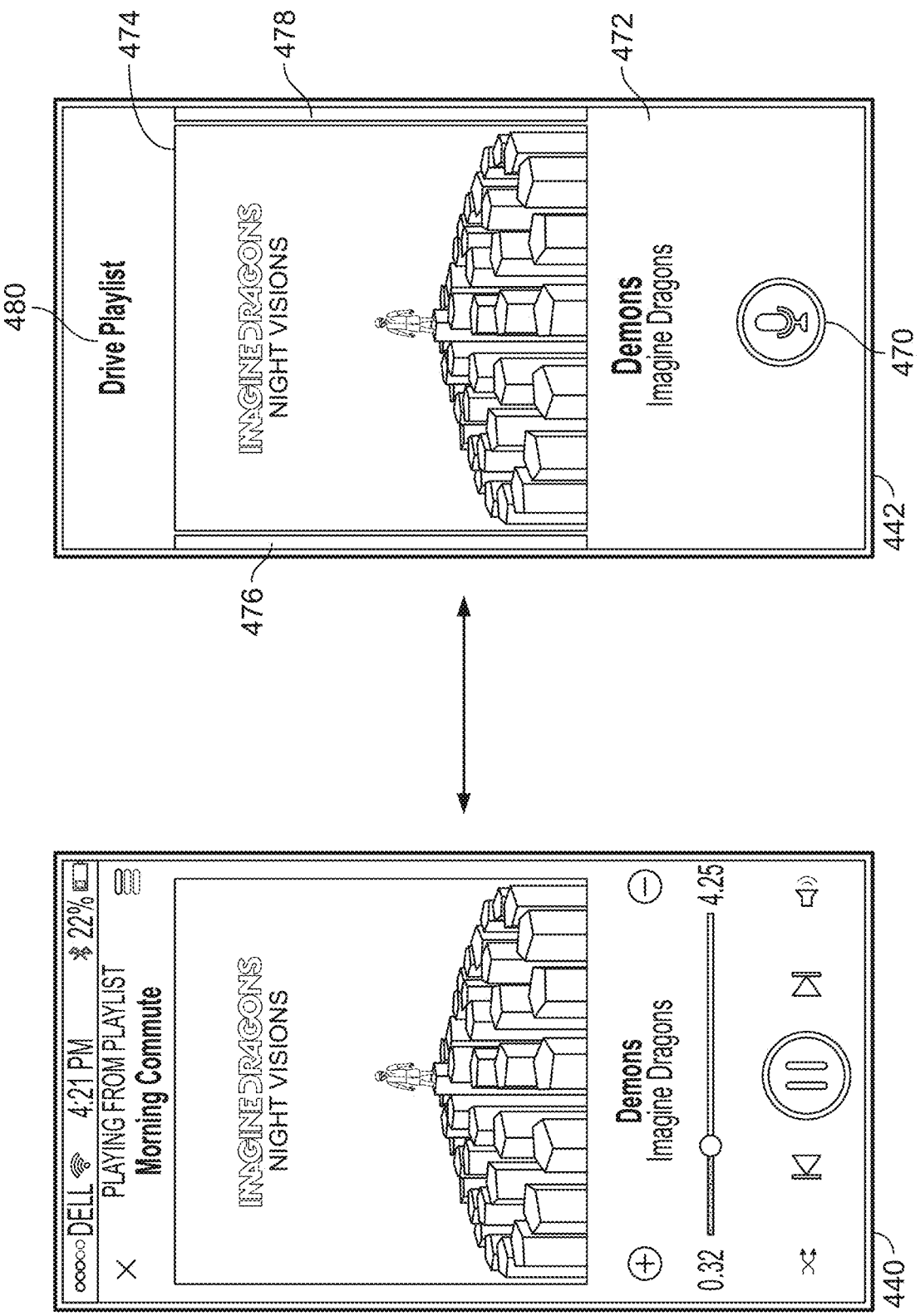
FIG. 7 includes schematic diagrams of a normal-mode user interface screen and a travel-mode user interface screen that are generated and displayed by some embodiments of the media-playback device of FIG. 1.

FIG. 7 includes schematic diagrams of a normal-mode user interface screen 440 and a travel-mode user interface screen 442 that are generated and displayed by some embodiments of the media-playback device 102. As can be seen, the normal-mode user interface screen 440 include more user-interface elements than the travel-mode user interface screen 442 and the travel-mode user interface screen 442 includes fewer user-interface elements than the normal-mode user interface screen 440.

For example, the normal-mode user interface screen 440 includes a set of playback controls (e.g., shuffle, previous, play/pause, next) along the bottom of the screen. The normal-mode user interface screen 440 also includes a timeline indicator that shows the current playback location within the media content item, elapsed time, and remaining time. The normal-mode user interface screen 440 displays the media content item name and artist in a first set of font sizes. The normal-mode user interface screen 440 also includes controls for adding the currently playing media content item to a playlist and accessing more information about the currently playing media content item and other related media content items. The normal-mode user interface screen 440 also includes a graphical representation of the currently playing media content item. Additionally, the normal-mode user interface screen 440 includes the title of the currently playing playlist and various controls for interacting with the playlist.

In contrast, the travel-mode user interface screen 442 includes far fewer elements than the normal-mode user interface screen 440. In this example, the travel-mode user interface screen 442 includes a voice command control 470, a textual description 472 of the name and artist of the media content item, a graphical representation 474 of the currently playing media content item, a graphical representation 476 of the previous media content item, a graphical representation 478 of the next media content item queued to play, and a textual description 480 of the playlist.

When the voice command control 470 is actuated, the media-playback device 102 captures audio which is then interpreted as a voice command. In some embodiments, the voice command control 470 is actuated with a single touch. In other embodiments, the voice command control 470 is actuated with a long press touch.

The textual description 472 displays the media content item name and artist using a second set of font sizes. In some embodiments, the font sizes in the second set of font sizes are larger than corresponding font sizes in the first set of font sizes used in normal-mode user interface screen 440 (i.e., the font size of the media content item name is larger in travel-mode user interface screen 442 than in the normal-mode user interface screen 440 and the font size of the artist name is larger in travel-mode user interface screen 442 than in normal-mode user interface screen 440).

The graphical representations 476 and 478 show the user the previously played media content item and the upcoming media content item, respectively. The graphical representations 476 and 478 may include an image that corresponds to the respective media content items. As shown in FIG. 7, the graphical representations 476 and 478 are portions of the associated image (e.g., the associated images may be cropped). Specifically, the graphical representation 476 is a rightmost portion of an image corresponding to its associated media content item and the graphical representation 478 is a leftmost portion of an image corresponding to its associated media content item. Although alternatives are possible, the graphical representation 476 may include no more than about 5% of the corresponding image, no more than about 10% of the corresponding image, no more than about 25% of the corresponding image, or no more than a different percentage of the corresponding image. Similarly, the graphical representation 478 may include no more than about 5% of the corresponding image, no more than about 10% of the corresponding image, no more than about 25% of the corresponding image, or no more than a different percentage of the corresponding image.

The textual description 480 of the playlist can include the name of the playlist and/or other information about the playlist, such as the number of media content items in the playlist. In some embodiments, the textual description 480 includes only the name of the playlist so as to minimize the amount of text displayed in travel mode.

Figure 8:
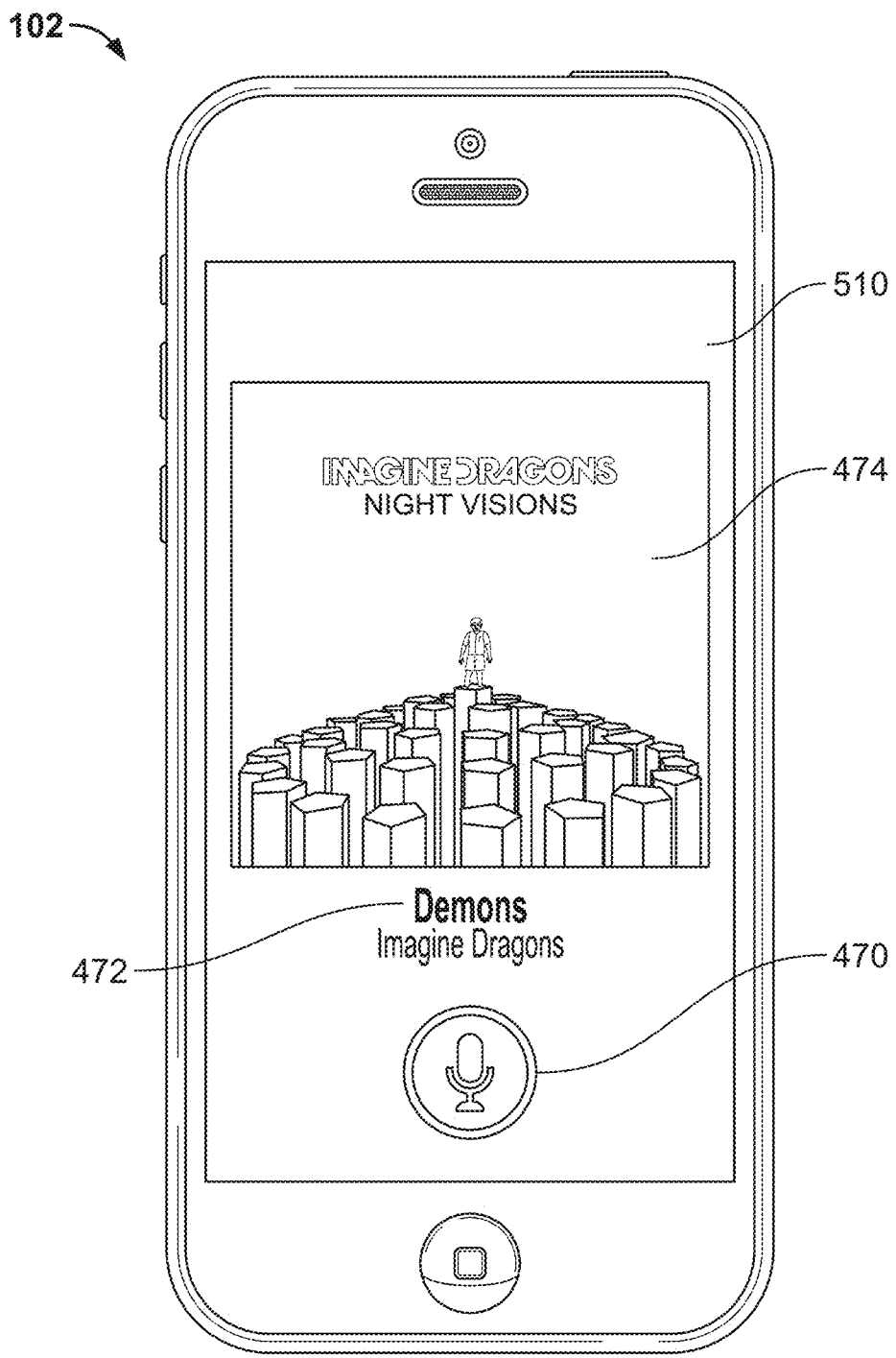
FIG. 8 is a schematic diagram of another embodiment of a user interface screen generated by some embodiments of the media-playback device of FIG. 1 when operating in a travel mode.

FIG. 8 is a schematic diagram of another embodiment of a user interface screen 510 generated by some embodiments of the media-playback device 102 when the media-playback device 102 is operating in a travel mode. The user interface screen 510 is similar to the travel-mode user interface screen 442 except that the user interface screen 510 includes fewer user interface elements. In this example, the user interface screen 510 includes the voice command control 470, textual description 472, and graphical representation 474. The user interface screen 510 does not include the graphical representation 476, the graphical representation 478, and the textual description 480. It should be understood that other embodiments are possible that include more, fewer, or different elements in the travel mode.

Figure 9:
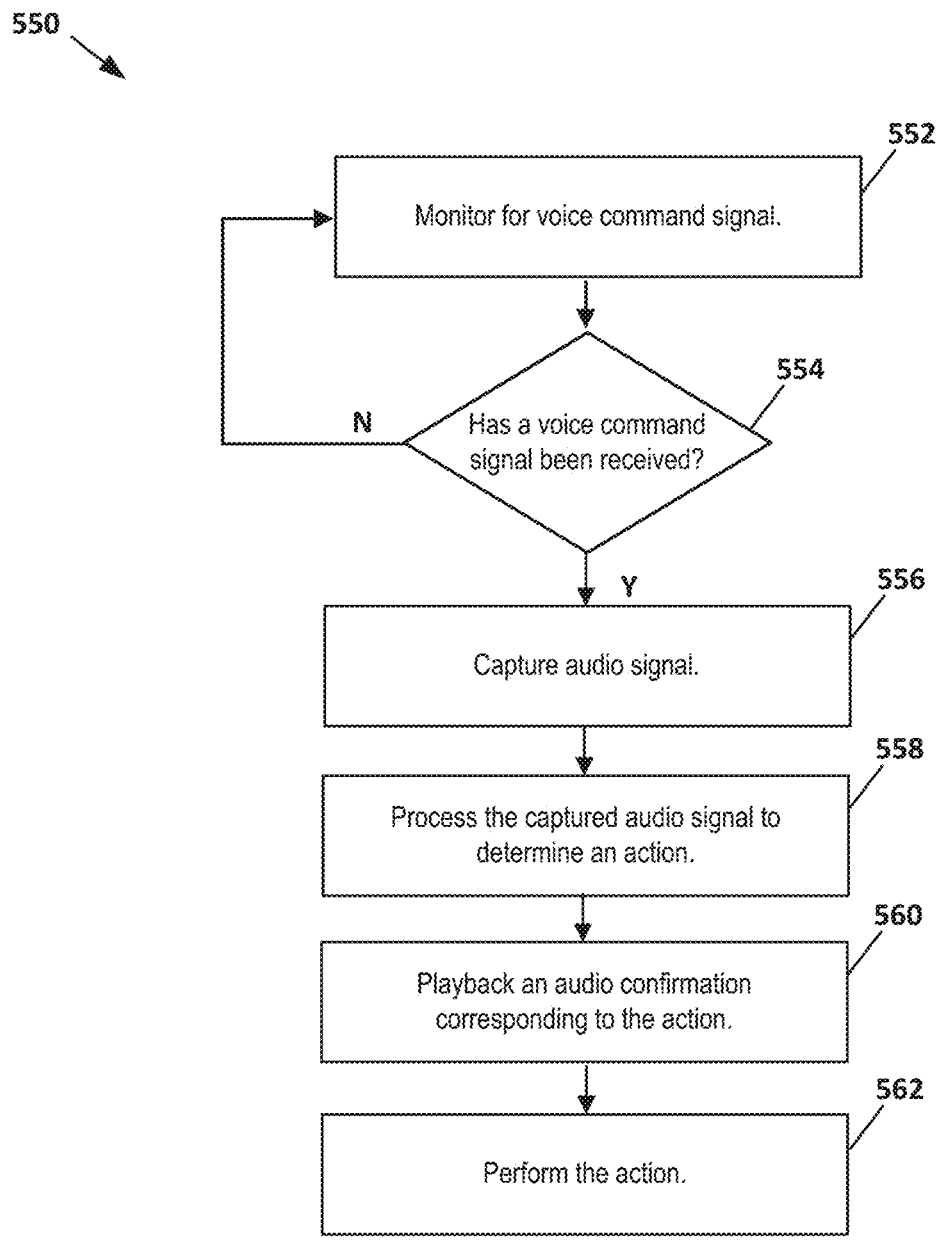
FIG. 9 illustrates an example method of receiving voice command input by a media content playback during travel performed by some embodiments of the media-playback device of FIG. 1.

FIG. 9 illustrates an example method 550 of receiving voice command input by a media content playback during travel performed by some embodiments of the media-playback device 102.

At operation 552, the media playback device monitors for a voice command signal. Monitoring for a voice command signal can comprise monitoring for a particular keyword or phrase to be spoken as described above. This monitoring may comprise capturing a short audio recording and processing the recording to determine whether the keyword or phrase is included in the recording. In at least some embodiments, the processing is performed locally by the media-playback device 102. In some examples, the monitoring mode may change responsive to determining the media-playback device 102 is operating in a travel mode. For example, the media-playback device 102 may change from a non-monitoring mode to a monitoring mode responsive to determining that the media media-playback device is operating in a travel mode.

Additionally or alternatively, monitoring for a voice command signal can include monitoring for a particular touch input or gesture. For example, some embodiments include a voice command control on a user interface that when actuated generates a voice command signal.

At operation 554, it is determined whether a voice command signal has been received. If so, the method proceeds to operation 556. If not, the method returns to operation 552 to continue monitoring for a voice command signal.

At operation 556, an audio signal is captured. The audio signal can be captured by the audio-capture device of the media-playback device. In some embodiments, an audio signal of a predetermined length is captured. Alternatively or additionally, an audio signal is captured until a property of the captured audio signal meets a particular condition. For example, audio capture may continue until the captured audio meets a condition indicating that no one is speaking (e.g., the volume of the audio signal within a particular frequency band corresponding to human speech is below a particular threshold for a particular time period).

Additionally, in some embodiments, an audio prompt is played at the beginning of operation 556 to guide the user regarding when to start speaking. The audio prompt may include a particular sound or a spoken phrase (e.g., "What can I do?" or "What would you like to listen to?").

At operation 558, the captured audio signal is processed to determine an action for the media-playback device to perform. The audio signal may be processed to identify keywords that correspond to commands. Additionally, the audio signal may be processed to identify an intent associated with the captured audio signal. In some embodiments, the captured audio signal is processed locally by the media-playback device, while in other embodiments the media-playback device transmits the captured audio signal to another computing device (e.g., the media-delivery system 104) for processing. Combinations thereof are possible as well. In at least some embodiments, the action is a media-playback action that relates to the playback of media content items.

At operation 560, an audio confirmation corresponding to the action is played back. For example, if the action is determined to be a request to playback media content items from a playlist named Discovery Weekly, the audio confirmation may convey that the playlist will begin playing (e.g., "Starting playlist Discover Weekly").

At operation 562, the determined action is performed. For example, the media-playback device will begin playback of the requested playlist.

Figure 10:
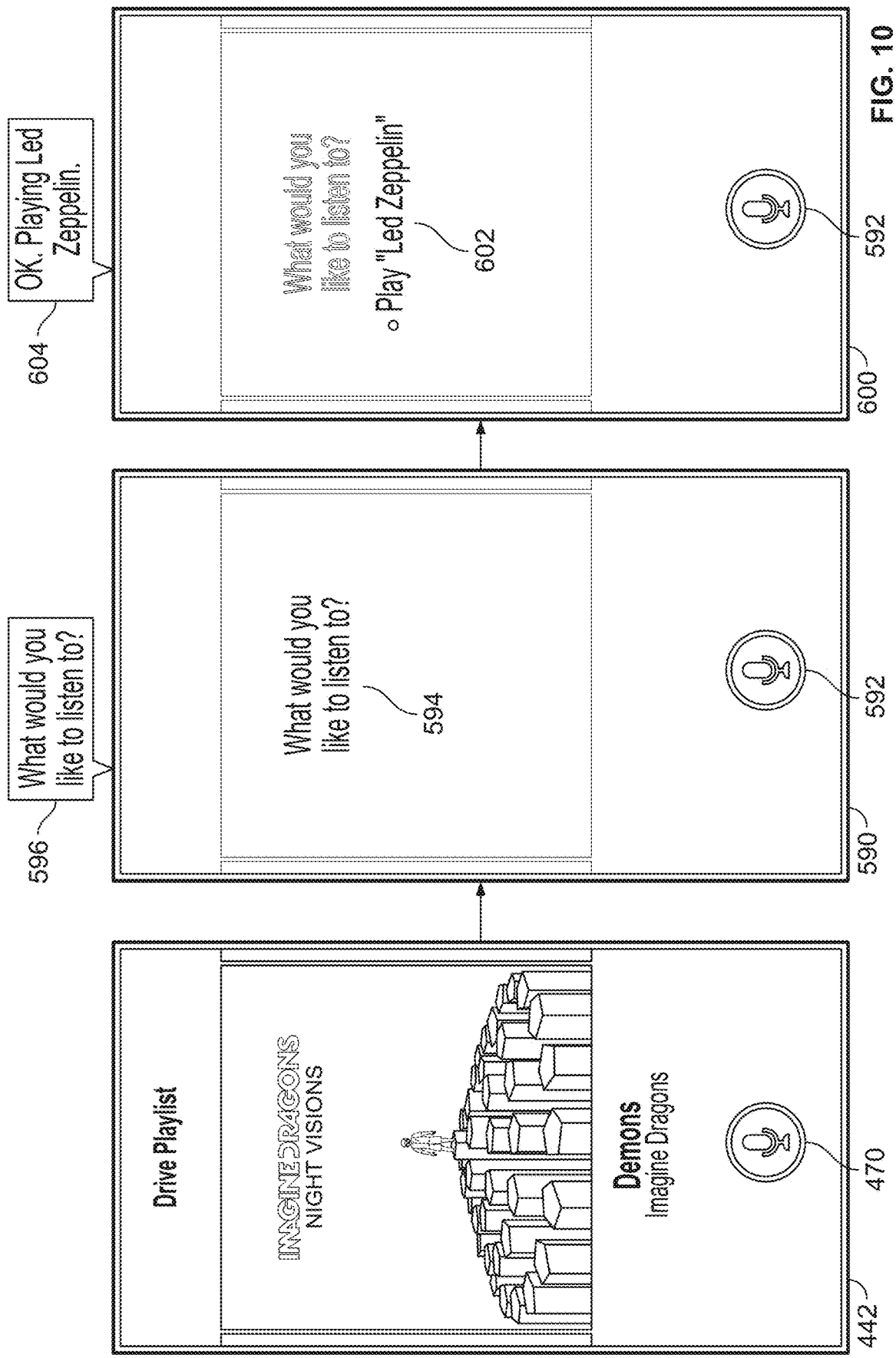
FIG. 10 includes schematic diagrams of series of example user interface screens generated and shown in travel mode during a voice command interaction with a user by some embodiments of the media-playback device of FIG. 1.

FIG. 10 includes schematic diagrams of series of example user interface screens generated and shown in travel mode during a voice command interaction with a user by some embodiments of the media-playback device 102. FIG. 10 includes the travel-mode user interface screen 442, a user interface screen 590 for receiving voice input, and a user interface screen 600 for responding to voice input.

The travel-mode user interface screen 442 has been described above. The travel-mode user interface screen 442 may be shown while a media content item is being played in a travel mode. If a voice command signal is received while the travel-mode user interface screen 442 is being displayed (e.g., due to actuation of voice command control 470), the user interface screen 590 will be displayed.

The user interface screen 590 includes a voice command mode indicator 592 and visual prompt 594. In an example, the voice command mode indicator 592 can be shown in green to indicate that the media-playback device 102 is now listening for a voice command. The illustrated visual prompt 594 includes text that says "What would you like to listen to?" Other embodiments can include different or additional text.

When the user interface screen 590 is shown, an audio prompt 596 is generated. The audio prompt 596 may include spoken text such "What would like to listen to?" as is shown in the figure. Other text or sounds can be included in other embodiments.

Once a voice command has been received from the user, the user interface screen 600 will be displayed. The user interface screen 600 includes the voice command mode indicator 592 and a visual prompt 602.

The visual prompt 602 includes text indicating the determined action/command. In this case, the text says "Play Led Zeppelin", which may correspond to what the media-playback device 102 understood a user as having said. Additionally, an audio prompt 604 is generated and played back by some embodiments when the command is determined. In this example, the audio prompt says "OK. Playing Led Zeppelin." For example, the audio prompt may be generated using text-to-speech/voice synthesis technology or by playing back a stored recording.

As described above, the voice command mode indicator 592 indicates that the microphone is continuing to record sounds. In this example, the microphone may continue recording after determining the command for a predetermined time period. This additional recording may be processed to receive a correction from the user (e.g., the user may say "No. Play Lead Belly"). Some embodiments do not continue to capture audio after a command is received.

Figure 11:
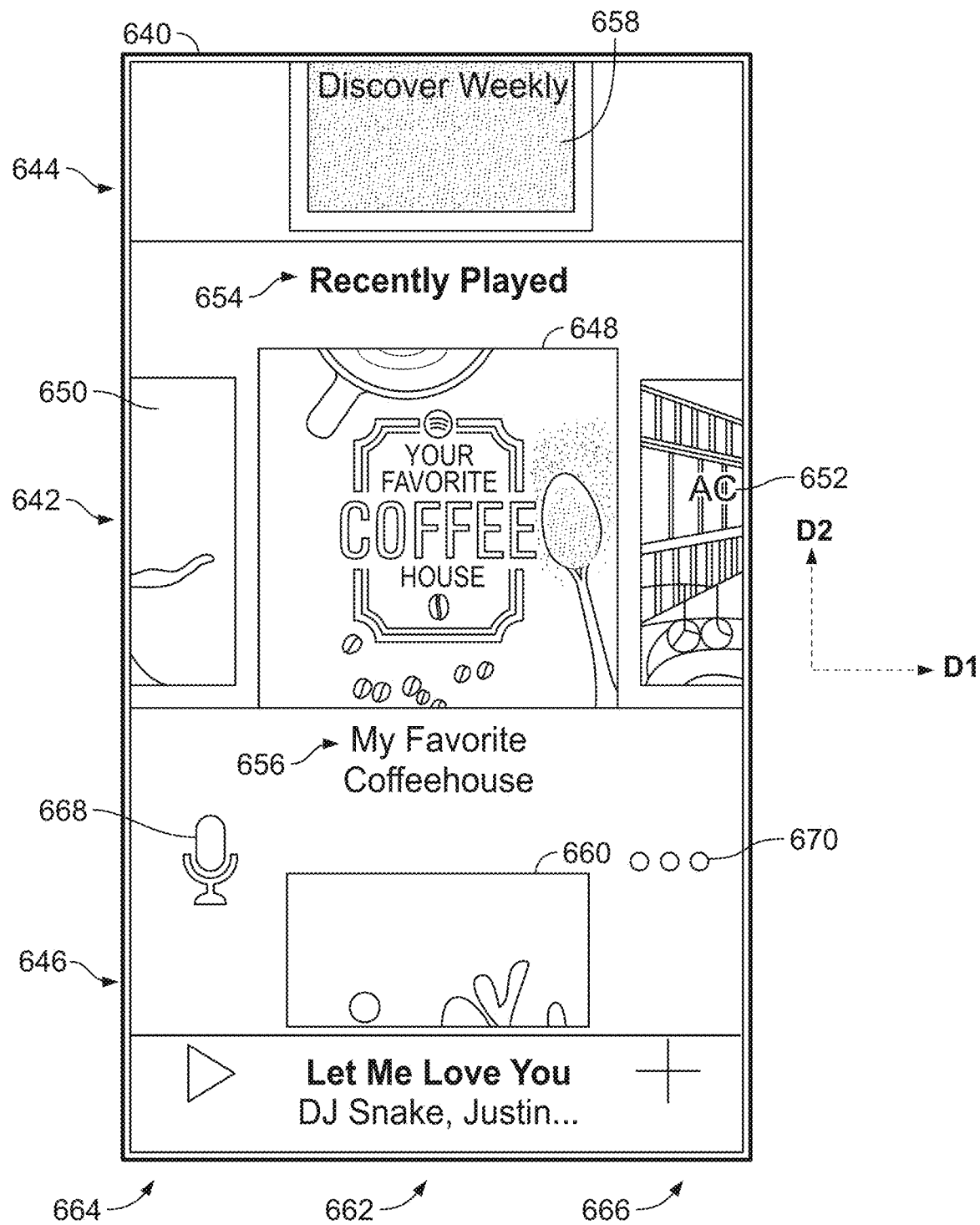
FIG. 11 is a schematic diagram of another embodiment of a user interface screen generated by some embodiments of the media-playback device of FIG. 1 when operating in a travel mode.

FIG. 11 is a schematic diagram of another embodiment of a user interface screen 640 generated by some embodiments of the media-playback device 102 when the media-playback device 102 is operating in a travel mode. The user interface screen 640 presents a plurality of cards on shelves that represent media content items that can be selected for playback. The cards are arranged along the shelves in a first direction D1 (e.g., horizontal in this figure) and the shelves are arranged in a second direction D2 (e.g., vertical in this figure) relative to each other. In some embodiments, the cards correspond to playlists of media content items and the shelves correspond to groups of playlists. In some embodiments, the cards correspond to individual media content items and the shelves correspond to playlists.

The media-playback device is configured to receive touch inputs to switch to a different card (e.g., playlist) or to select a card from a different shelf and, in doing so, change the focus of the user interface screen 640 to a different shelf. For example, a swipe touch input that is primarily directed in a horizontal direction will change to a different card in the current shelf and a swipe touch input that is primarily directed in a vertical direction will change to a different card in a different shelf. In some examples, changing to a different card or a different shelf can cause automatic playback of the changed-to card or a card from the changed-to shelf. In other examples, an additional user input is required to cause playback of the changed-to element.

In some embodiments, the primary direction of a received swipe touch input is determined by comparing the vertical change to the horizontal change between the initial contact point for the swipe touch input and the final contact point for the swipe touch input and selecting the direction with a greater magnitude of change. Alternatively, the primary direction of a received swipe touch may be based on determining the primary direction (as described above) of a portion of the swipe touch input (e.g., a first portion of a predetermined duration, a middle portion of a predetermined duration, a final portion of a predetermined duration or by excluding an initial or final portion of a predetermined duration the swipe touch input).

Some embodiments are configured to recognize a swipe touch input received at any location on the user interface screen 640 as a command to select a different card and/or shelf as described above. Other embodiments are configured to recognize only those swipe touch inputs that begin within a particular portion of the user interface screen 640 (e.g., on or near the currently playing card or on or near the current shelf) as a command to select a different card and/or shelf as described above.

In this example, the user interface screen 640 includes a currently selected shelf 642, an upper shelf 644, lower shelf 646. The currently selected shelf 642 displays graphical elements associated with a group of cards, including the graphical element 648 associated with a currently active card. The currently selected shelf 642 also displays a graphical element 650 and a graphical element 652 corresponding to other cards associated with the currently selected shelf 642. The graphical elements 650 and 652 are cropped to display only a portion of the images associated with the cards in some embodiments. As described above, various portions can be retained after cropping such as about 5%, about 10%, about 20%, about 25%, about 50%, or any other portion. The graphical elements 650 and 652 allow the user to preview the other options available on the currently selected shelf 642.

The user interface screen 640 also includes a textual descriptor 654 of the currently selected shelf 642. In this case, the textual descriptor 654 includes the textual "Recently Played," indicating that the cards in the currently selected shelf 642 are selected based on the user's recent listening history. The user interface screen 640 also includes a textual descriptor 656 of the currently playing card. In this example, the textual descriptor 656 includes the text "My Favorite Coffeehouse."

In this example, the upper shelf 644 includes a graphical element 658 corresponding to a card available on the upper shelf 644. Similarly, the lower shelf 646 includes a graphical element 660 corresponding to a card available on the lower shelf 646. In other embodiments, graphical elements for multiple cards available on the upper shelf 644 and the lower shelf 646 are included. The graphical element 658 and the graphical element 660 allow users to preview the cards available on the upper shelf 644 and the lower shelf 646 respectively. The graphical elements 658 and 660 can be cropped to display only portions of the image corresponding to the associated cards. For example, in this figure, the graphical elements 658 and 660 include images that are cropped horizontally to preserve a lower portion or upper portion of the corresponding images, respectively. Various portions of the graphical elements 658 and 660 can be retained after cropping such as about 5%, about 10%, about 20%, about 25%, about 50%, or any other portion.

The user interface screen 640 also includes various additional user interface elements. For example, the user interface screen 640 includes a textual description 662 of the currently playing media content item, a play-pause control 664, a like control 666, a voice command control 668, and an additional options control 670. The play-pause control 664 toggles playback of the currently playing media content item when actuated. The control 666 marks the currently playing media content item as a favorite (e.g., by setting a field in a database, adding the media content item to a playlist, etc.). The voice command control 668 activates a voice command mode and may be similar to the previously described voice command control 470. The additional options control 670 presents additional options when actuated. The additional options can, for example, relate to the currently playing media content item.

Additionally, in some embodiments a tap touch input is recognized as a skip forward command and a double tap touch input is recognized as skip backwards (or previous) command. The media-playback device 102 may be configured to recognize these skip forward/backward commands when the corresponding tap/double-tap inputs are received anywhere on the user interface screen 640. In these embodiments, actuating the other user interface elements may, for example, require a long tap. Alternatively, the media-playback device 102 may be configured to recognize these skip forward/backward commands when the corresponding tap/double-tap inputs are received anywhere on the user interface screen 640 such as on or near the graphical element 648 or on or near the currently selected shelf 642.

Figure 12:
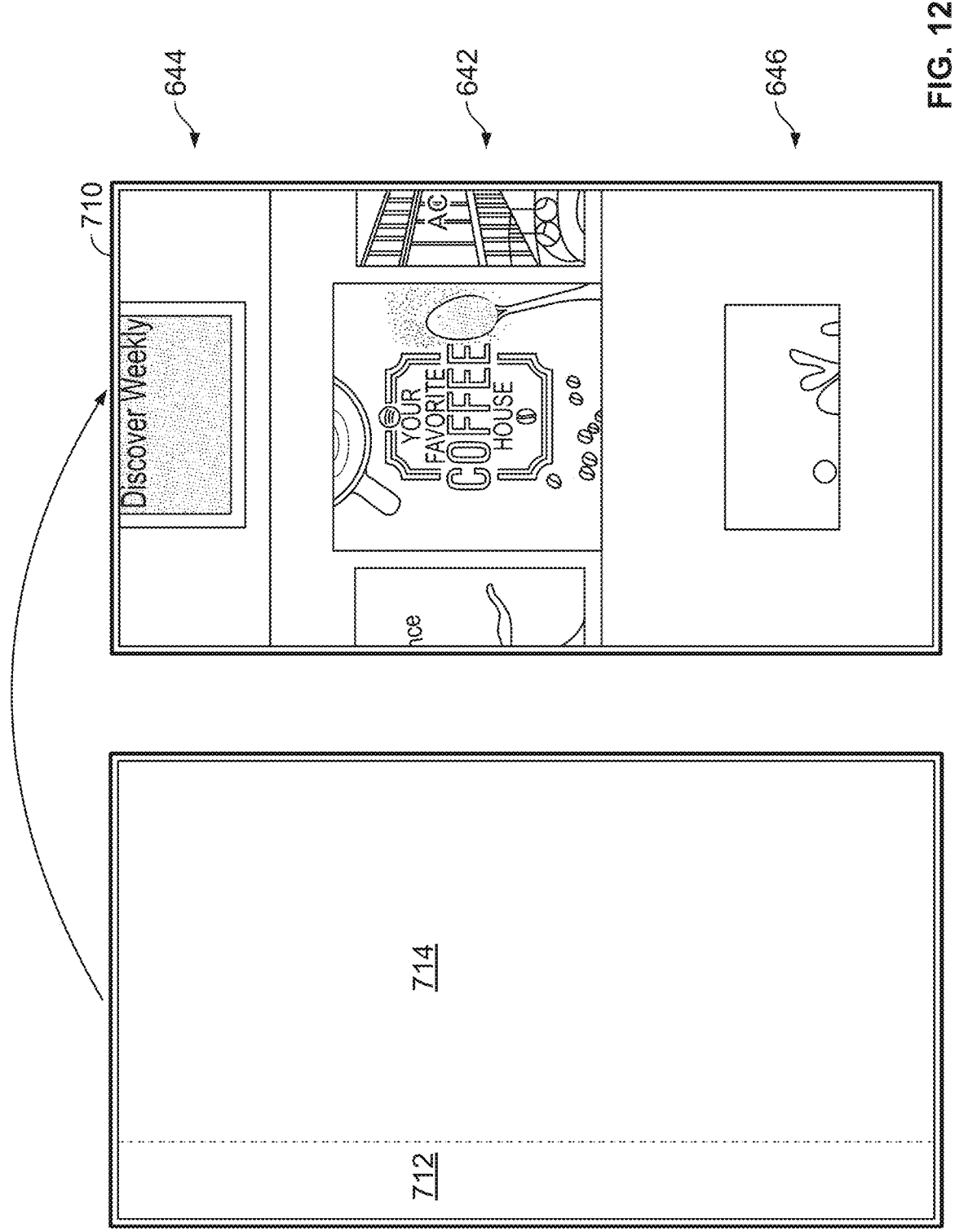
FIG. 12 is a schematic diagram of another embodiment of a user interface screen generated by some embodiments of the media-playback device of FIG. 1 when operating in a travel mode.

FIG. 12 is a schematic diagram of another embodiment of a user interface screen 710 generated by some embodiments of the media-playback device 102 when the media-playback device 102 is operating in a travel mode. Similar to the user interface screen 640, the user interface screen 710 presents a plurality of cards on shelves that represent media content items that can be selected for playback. Also shown are touch targets 712 and 714. The touch targets overlay the user interface screen 710 but are shown next to the user interface screen 710 for clarity. In other words, the touch targets 712 and 714 represent how the user interface screen 710 is divided into regions for interpreting touch inputs.

In this example, the media-playback device 102 is configured to recognize a tap touch input received in the touch targets 712 as a skip backward (previous) command, and a tap touch input received in the touch targets 714 as a skip forward command. In this example, the user interface screen 750 is divided vertically between the touch targets 712 and touch targets 714. The touch targets 712 are disposed over a left-most portion of the screen and the touch targets 714 is disposed over the remainder of the screen. In this example, the touch targets 714 is larger than the touch targets 712 to allow users to more easily perform a skip forward action. In some embodiments, other divisions between the touch targets 712 and the touch targets 714 are used. For example, the division can be at 10%, 20%, 25%, 33%, 40%, 50%, or another percentage of the screen.

Figure 13:
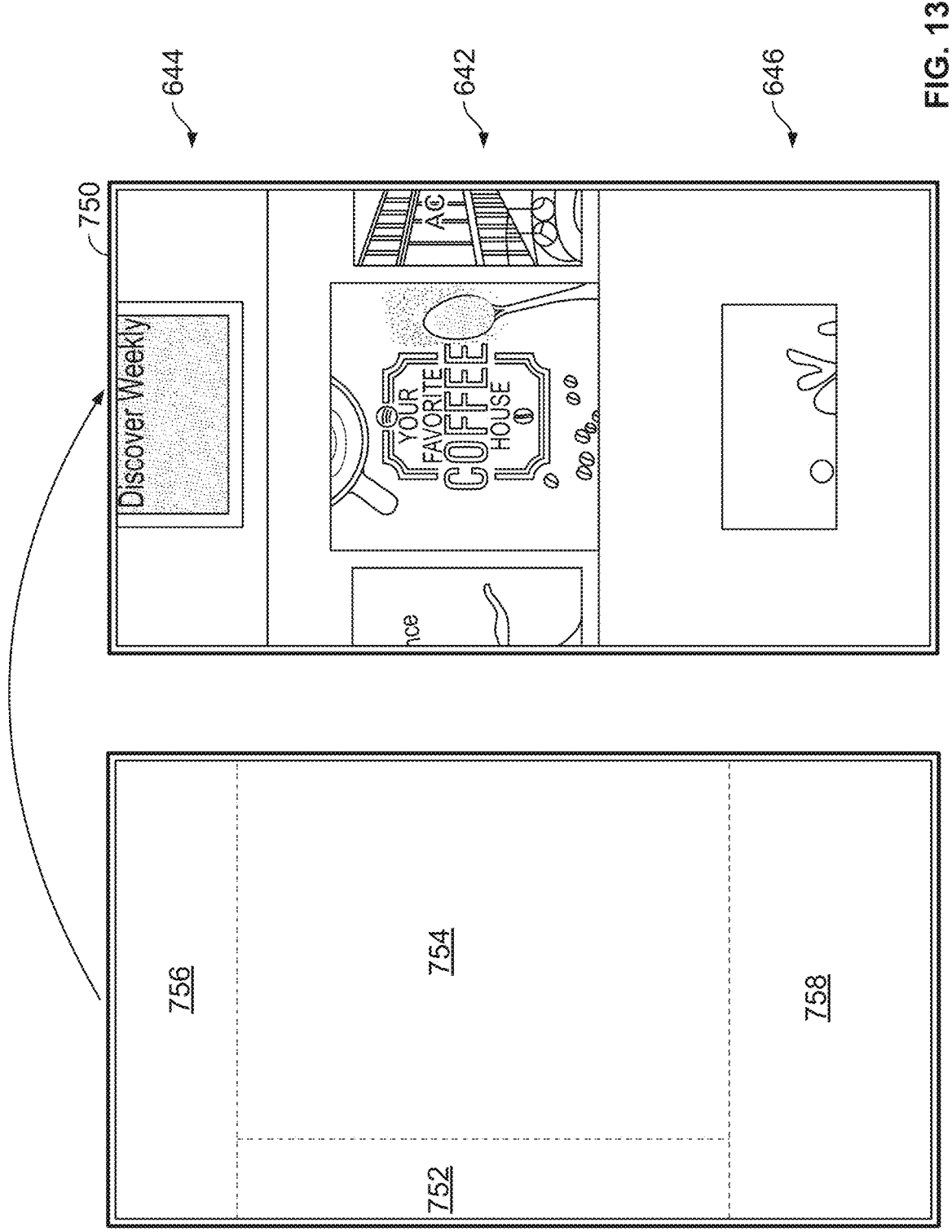
FIG. 13 is a schematic diagram of another embodiment of a user interface screen generated by some embodiments of the media-playback device of FIG. 1 when the operating in a travel mode.

FIG. 13 is a schematic diagram of another embodiment of a user interface screen 750 generated by some embodiments of the media-playback device 102 when the media-playback device 102 is operating in a travel mode. The user interface screen 750 is similar to the media-playback engine 170 discussed above with respect to FIG. 12. However, in this example, the user interface screen 750 is divided into a touch target 752, a touch target 754, a touch target 756, and a touch target 758. The touch targets 752 and 754 may operate similarly to the previously described touch targets 712 and 714. However, the touch target 752 and 754 do not extend from the top to the bottom of the user interface screen 750. Instead, the touch targets 756 and 758 are disposed as horizontal bands across the top and bottom of the user interface screen 750 respectively. Various embodiments are configured to provide various functionality when tap touch inputs are detected within the touch target 756 and the touch target 758 (e.g., switching shelves, actuate a different user interface element such as those shown with respect to user interface screen 640 in FIG. 11).

Similar to the user interface screen 640, the user interface screen 710 presents a plurality of cards on shelves that represent media content items that can be selected for playback. Also shown are touch targets 712 and 714. The touch targets overlay the user interface screen 710 but are shown next to the user interface screen 710 for clarity. In other words, the touch targets 712 and 714 represent how the user interface screen 710 is divided into regions for interpreting touch inputs.

Figure 14:
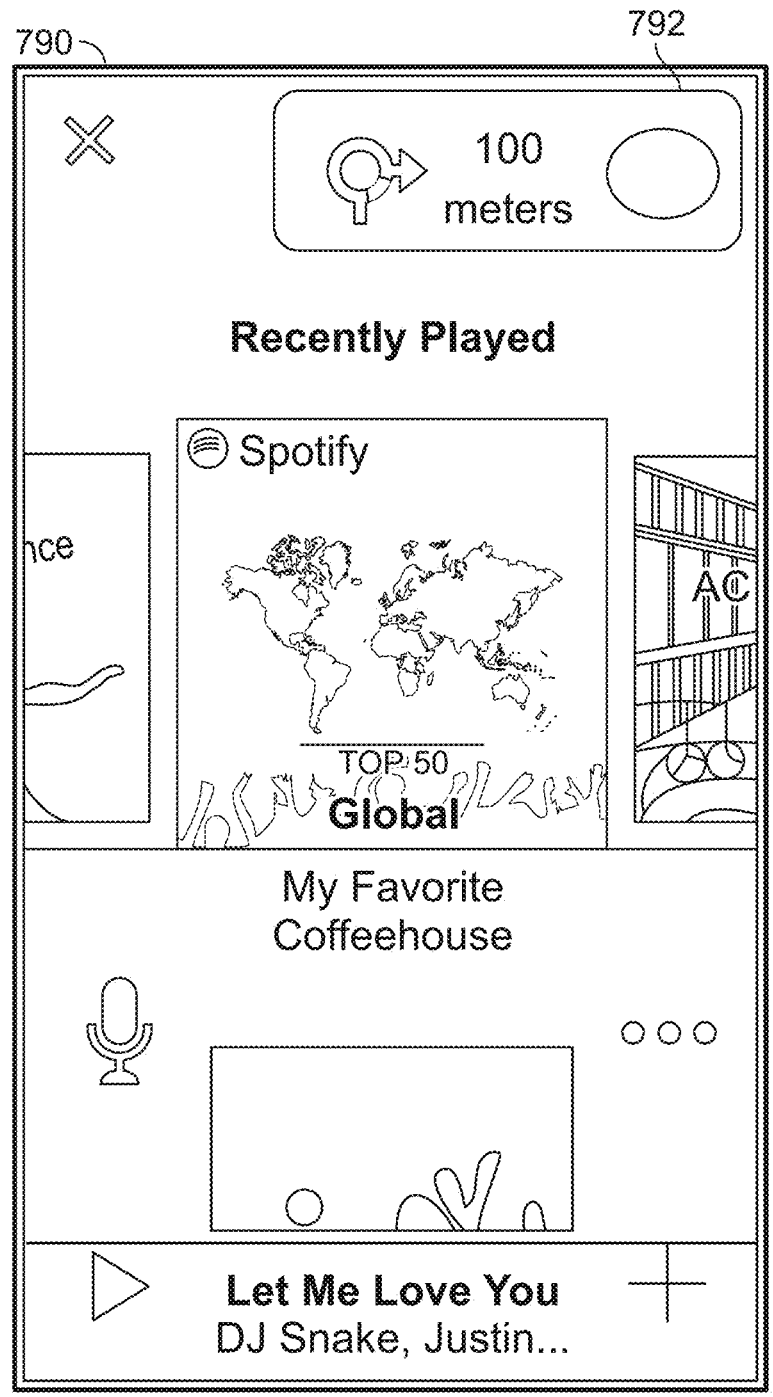
FIG. 14 is a schematic diagram of another embodiment of a user interface screen generated by some embodiments of the media-playback device of FIG. 1 when operating in a travel mode.
Figure 15:
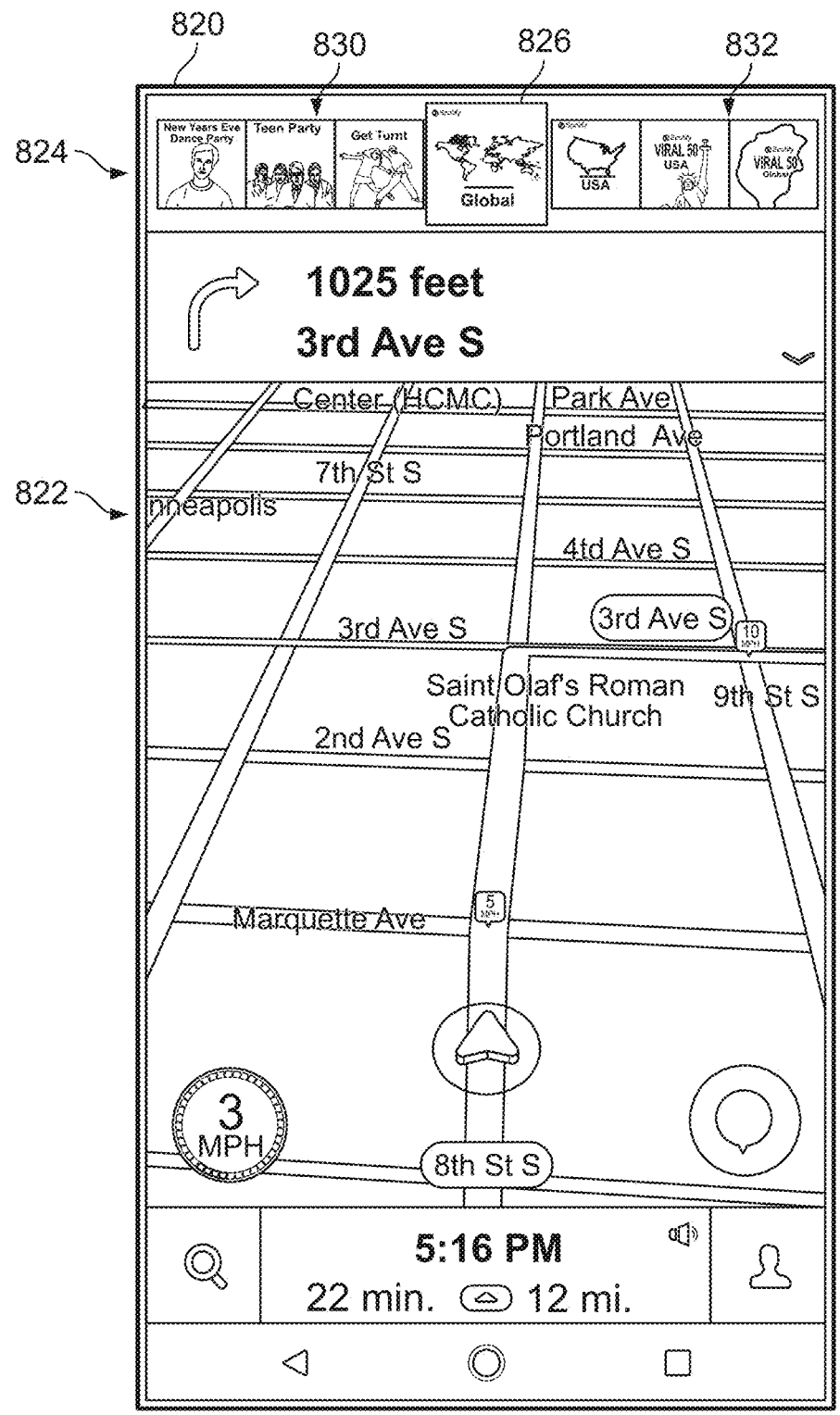
FIG. 15 is a schematic diagram of another embodiment of a user interface screen generated by some embodiments of the media-playback device of FIG. 1 when operating in a travel mode.

FIG. 14 is a schematic diagram of another embodiment of a user interface screen 790 generated by some embodiments of the media-playback device 102 when the media-playback device 102 is operating in a travel mode. The user interface screen 790 is similar to the user interface screen 640 shown in FIG. 11 except that the user interface screen 790 also includes information pane 792. In this example, the information pane 792 includes navigation information provided by a navigation application. Here, the navigation information comprises next turn information. In some embodiments, the media-playback device 102 is configured to switch to a different application in response to receiving a touch input within the information pane 792. For example, the media-playback device 102 may switch to the navigation application providing the next turn information (e.g., as shown in FIG. 15). Additionally, some embodiments include a user-actuatable interface element to expand the information pane 792 to provide additional information overlaid on the user interface screen 790. The information shown in the information pane 792 is generated by a third-party application in some embodiments. Although the example shown in this figure relates to a navigation information and specifically next turn information. Other types of information can be shown too such as traffic information, weather information, communication information, etc.

FIG. 15 is a schematic diagram of another embodiment of a user interface screen 820 generated by some embodiments of the media-playback device 102 when the media-playback device 102 is operating in a travel mode. The user interface screen 820 allows for control of media content playback while providing content from another application. In this embodiments, the user interface screen 820 includes an application content panel 822 and a media content selection panel 824.

In some embodiments, the media-playback engine 170 receives the content displayed in the application content panel 822 from another application running on the media-playback device 102. Alternatively, the media-playback engine 170 transmits the content displayed within the media content selection panel 824 to another application running on the media-playback device 102 for display within the application. In this example, the application content panel 822 includes content related to navigating.

The media content selection panel 824 includes controls for selecting media content items for playback. In this example, the media content selection panel 824 includes a shelf that includes a currently playing card 826, additional cards 830 that can be accessed and selected with a swipe left touch input, and additional cards 832 that can be accessed and selected with a swipe right touch input. In some embodiments, a tap touch input within the media content selection panel 824 is recognized as a skip forward command and a double-tap touch input is recognized as a skip backward (previous) command.

Figure 16:
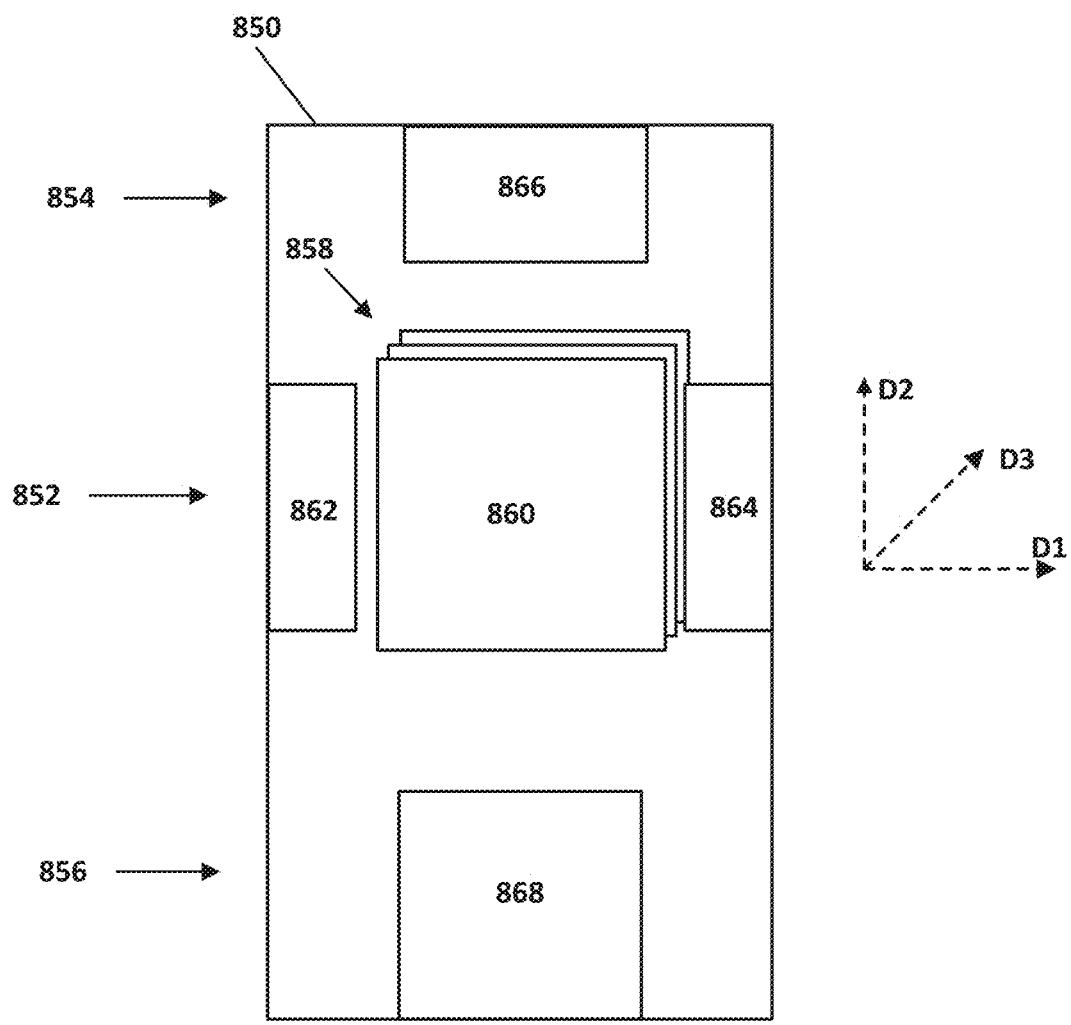
FIG. 16 is a schematic diagram of an embodiment of a user interface screen that is generated by some embodiments of the media-playback device of FIG. 1 when operating in a travel mode.

FIG. 16 is a schematic diagram of an embodiment of a user interface screen 850 that is generated by some embodiments of the media-playback device 102 when the media-playback device 102 is operating in a travel mode. Similar to the user interface screen 640, the user interface screen 850 presents a plurality of cards on shelves that represent media content items that can be selected for playback. In this embodiment, a stack of cards 858 is provided on the user interface for interacting with a selected playlist.

The user interface screen 850 includes a currently selected shelf 852, an upper shelf 854 and a lower shelf 856. The currently selected shelf 852 is similar to the previously described currently selected shelf 642 except that the currently selected shelf 852 includes the cards 858. In this example, the currently selected shelf 852 is shown to also include graphic elements 862 and 864 associated with other cards on the shelf 852.

The upper shelf 854 includes a graphical element 866 associated with a card on the upper shelf 854. The upper shelf 854 may be similar to the previously described upper shelf 644.

The lower shelf 856 includes a graphical element 868 associated with a card on the lower shelf 856. The lower shelf 856 may be similar to the previously described lower shelf 646.

The stack of cards 858 includes a plurality of cards, including a card associated with the graphical element 860. For example, the stack of cards 858 can include a card for each media content item within a playlist being played by the media-playback device 102. The stack of cards 858 includes a graphical element 860 associated with the currently playing media content item.

In the embodiment shown, the stack of cards 858 is rendered in a perspective-like view to indicate that multiple cards are available in the cards 858. The number of cards shown in the rendered graphic may but does not necessarily correspond to the actual number of cards in the cards 858. Additionally, some embodiments do not render the cards 858 using a perspective-like view. These embodiments can include other visual indicators that there are multiple cards in the stack of cards. It should be understood, however, that some embodiments do not include any visual indicator that there are multiple cards in the stack of cards.

As described with respect to user interface screen 640, the cards are arranged along the shelves in a first direction D1 (e.g., horizontal in this figure) and the shelves are arranged in a second direction D2 (e.g., vertical in this figure) relative to each other. When a user input (e.g., a horizontal swipe touch or gesture) corresponding to the direction D1 is received, a different card from within the currently selected shelf 852 will be selected as the active card. Similarly, when a user input (e.g., a vertical swipe touch or gesture) corresponding to the direction D2 is received, a different shelf will become the active shelf.

With the cards 858, the cards are arranged within a third dimension D3 that is normal to the surface of the media-playback device 102 (e.g., a dimension that goes into and out of the screen). The third dimension is sometimes referred to as a Z-dimension or depth. When a user input (e.g., a tap into the screen, a double tap into the screen, a long press) corresponding to the dimension D3 is received, a different card from within the cards 858 will be selected as the active card. When a card from the stack of cards 858 becomes the active card, the media-playback device 102 will typically begin to playback the media content item associated with that card. When such an input is received, some embodiments, generate an animation showing the card at the top of stack moving to the back. In some embodiment of the travel mode interfaces, however, these animations are not displayed.

As described previously, the cards on the shelves typically correspond to playlists (i.e., groups of multiple media content items). The same is generally true for the cards corresponding to the graphical elements 862, 864, and 866 (i.e., all of the cards shown in the user interface screen 850 except those in the cards 858). Although alternatives are possible, each card of the cards 858 typically corresponds to a single media content item. The cards corresponding to a playlist will be referred to as playlist cards (e.g., those corresponding to the graphical elements 862, 864, 866, and 868) and the cards corresponding to a media content item will be referred to as media content item cards (e.g., those in the cards 858, including the graphical element 860).

When one of the playlist cards becomes the active card in response to a user input corresponding to either the direction D1 or the direction D2, the newly active playlist card is converted to a stack of cards comprising media content item cards. As a playlist card, the newly active card would typically be associated with a graphical element representing the playlist as a whole. In some embodiments, these playlist graphical elements comprise an image selected to convey the theme of the playlist (e.g., a cup of coffee for a coffeehouse related playlist). Additionally, in some embodiments, these playlist graphical elements are generated as a mosaic of cover art from the media content items within the playlist. Although alternatives are possible, when a playlist card becomes the active card, the graphical element associated with a graphical element associated with a first media content item within the playlist and shown as graphical element 860.

Alternatively, in some embodiments, a graphical element associated with a playlist trailer (which is described in more detail below) is shown initially as the first card (e.g., as graphical element 860) in the cards 858 while the playlist trailer is played back. After playback of the playlist trailer is complete, a graphical element corresponding to the first media content item card is then shown as graphical element 860.

Figure 17:
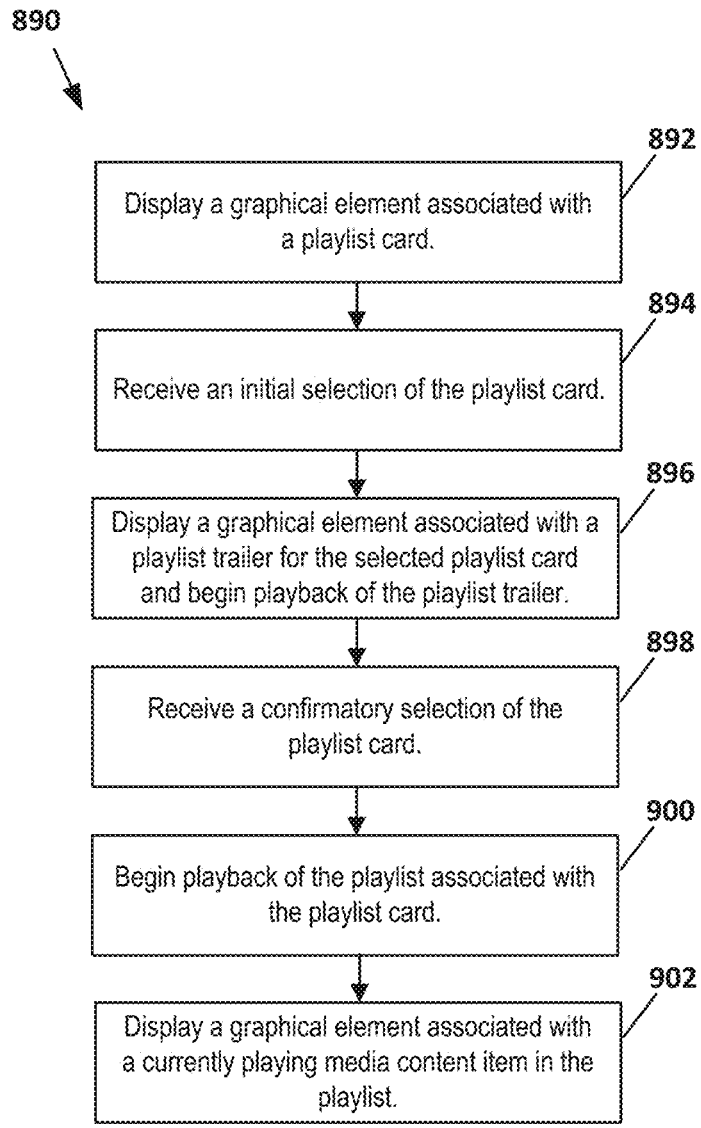
FIG. 17 illustrates an example method of playing back media content using a stack of cards user interface performed by some embodiments of the media-playback device of FIG. 1.

FIG. 17 illustrates an example method 890 of playing back media content using a stack of cards user interface performed by some embodiments of the media-playback device 102.

At operation 892, a graphical element associated with a playlist card is displayed. For example, the graphical element can be displayed on a shelf of a user interface screen of the media-playback device 102.

At operation 894, an initial selection of the playlist card is received. The initial selection may be a user input corresponding to a preview operation (e.g., a long press on a graphical element corresponding to the playlist card). In an example, a preview operation can automatically be performed when a playlist is selected or activated (e.g., by moving along or to a shelf).

At operation 896, a graphical element associated with a playlist trailer for the selected playlist card is displayed and playback of the playlist trailer begins. Generation of the playlist trailer and the graphical element associated with the playlist trailer is described in further detail below. The graphical element associated with the selected playlist trailer may be shown in place of the previously displayed graphical element associated with the playlist card.

At operation 898, a confirmatory selection of the playlist card is received. Examples of the confirmatory selection may include user input such as a single tap, releasing a long press and double tapping the playlist card, swiping the playlist card in a particular direction, and other types of user input. The confirmatory selection may also be inferred based on completing playback of the playlist trailer.

At operation 900, playback of the playlist associated with the playlist card begins. For example, playback may begin by playing back a first media content item within the playlist.

At operation 902, a graphical element associated with a currently playing media content item in the playlist is displayed. For example, the graphical element can be an image such as cover art associated with the media content item. Additionally, the graphical element can be a video (though, typically not during travel mode) such as a music video associated with the media content item.

Although the method 890 and the stack of cards interface (e.g., as shown and described with respect to FIG. 16) are often described in terms of a travel mode interface, they are not so limited. Both the method 890 and the stack of cards interface are usable in other modes and in other situations too.

Figure 18:
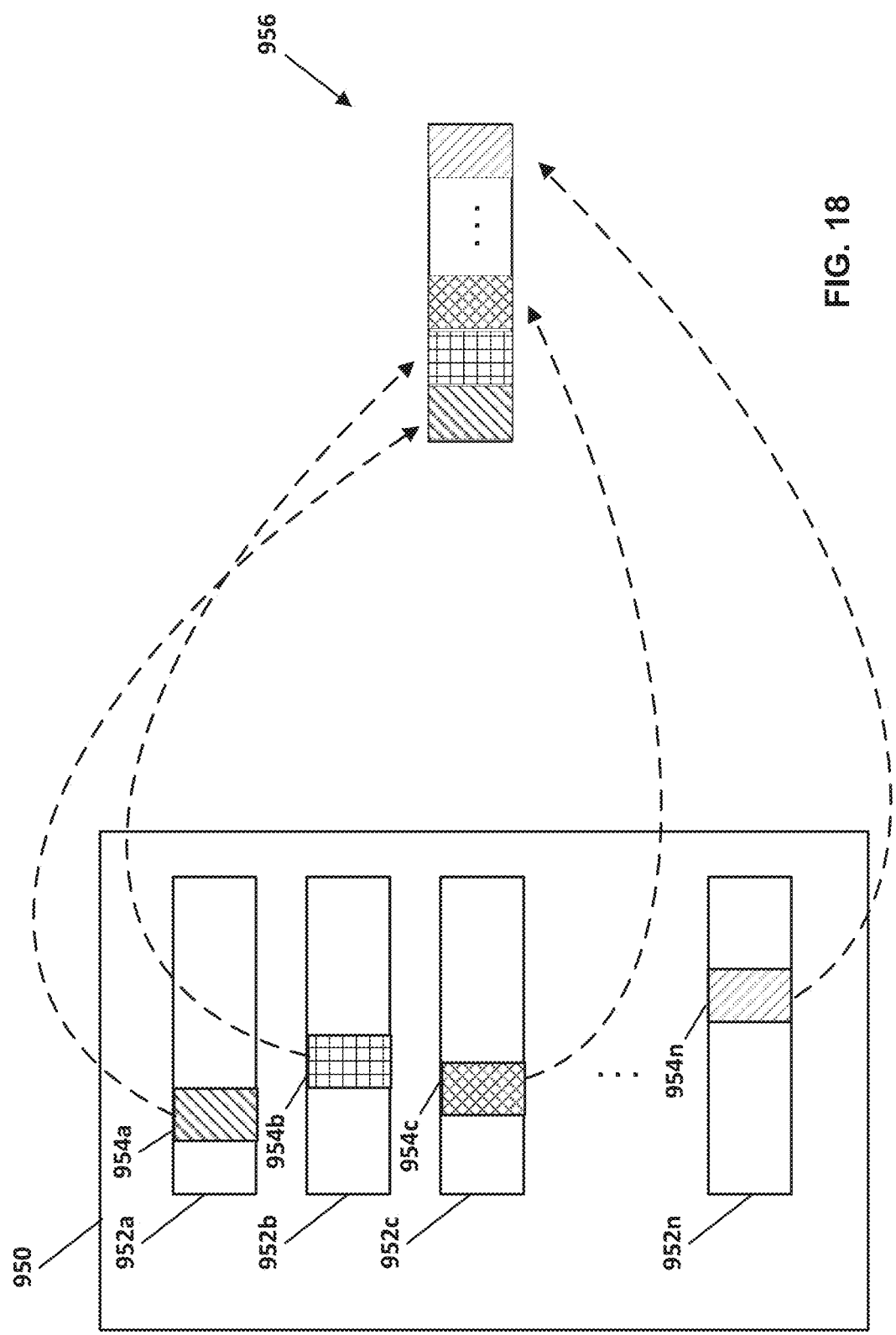
FIG. 18 includes a schematic diagram of a playlist and an associated playlist trailer generated by some embodiments of the media-playback system of FIG. 1.

FIG. 18 includes a schematic diagram of a playlist 950 and an associated playlist trailer 956. As shown in FIG. 18, the playlist 950 includes media content items 952a, 952b, and 952c through 952n. The playlist trailer 956 is generated from snippets of the media content items 952a, 952b, and 952c through 952n. At a minimum, the playlist trailer 956 includes at least two snippets.

In some embodiments, the playlist trailer 956 is generated using snippets from all of the media content items in the playlist 950. In other embodiments, the playlist trailer 956 is generated from a subset of the media content items in the playlist 950. For example, machine learning techniques such as kernel method (e.g., support vector machines) or clustering techniques may be used to identify a subset of the media content items that are representative of the full set of media content items (e.g., one media content item from each cluster). Alternatively, a subset may be generated by selecting randomly or otherwise a subset of the media content items. As another option, the subset may be generated by selecting randomly or otherwise one media content item associated with each genre, era, etc. represented in the playlist 950.

The snippets 954a-954n can be selected using various techniques. Although alternatives are possible, FIG. 18 shows the snippets being selected based on the location of the hooks in the media content items 952a-952n. The hook may comprise a short portion of the media content item that is particularly catchy or memorable. In some embodiments, the hook comprises the chorus or a portion of the chorus of a song. Timestamps corresponding to the location of the hook within a media content item may be stored in metadata associated with the media content items. By incorporating snippets that include the hook into the playlist trailer 956, a user listing to the playlist trailer may be more likely to recognize the media content item from which the snippet is extracted.

Other alternatives include selecting a snippet comprising a predetermined portion at the beginning of a media content item, in the middle of a media content item, or randomly. The snippets may all be of uniform duration or may have varying durations depending on the duration of the hook within the associated media content item (e.g., as specified in metadata associated with the media content items) or other factors.

In some embodiments, the playlist trailer 956 comprises a single media content item that is stored as file containing a concatenation of all of the snippets. In these embodiments, the playlist trailer 956 may be generated and stored by the media-delivery system 104.

Alternatively, the playlist trailer 956 can comprise metadata that essentially defined a playlist of snippets. The metadata may comprise data that identifies the media content items 952a-952n along with timestamps into the media content items 952a-952n that identify the start (and in some embodiments the end) of the snippet. The media-delivery system 104 may provide this metadata for the associated playlist trailer 956 and may provide one or more streams of media content to the media-playback device 102 for playback of the trailer. During playback of the associated playlist trailer 956, the media-playback device 102 then plays only the snippet portion of each of the media content items 952a-952n based on the metadata for the associated playlist trailer 956. In some of these embodiments, during playback of the associated playlist trailer 956 the media-playback device 102 is configured to receive tap inputs (or other inputs) as a command to skip the remainder of the currently playing snippet. In this manner, a user may very quickly preview a playlist.

Figure 19:
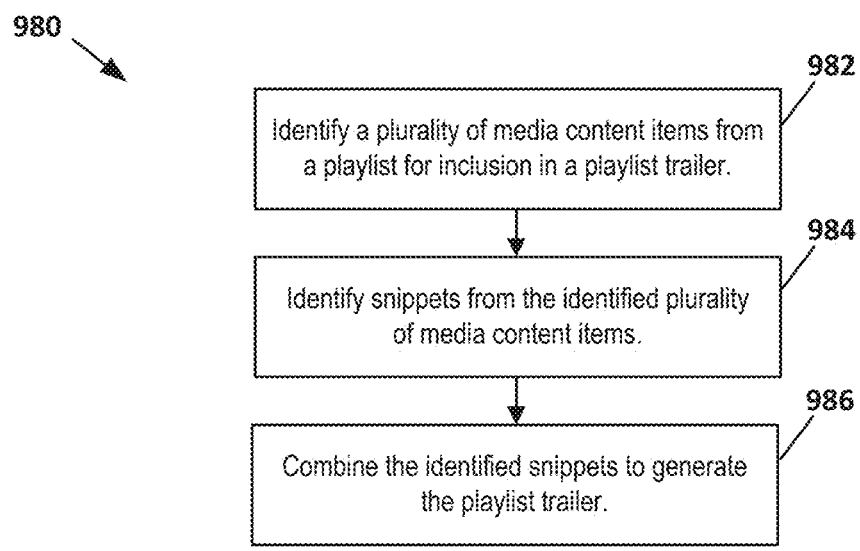
FIG. 19 illustrates an example method of generating a playlist trailer for a playlist performed by some embodiments of the media-playback system of FIG. 1.

FIG. 19 illustrates an example method 980 of generating a playlist trailer for a playlist performed by some embodiments of the media-playback system 100. For example, the method 980 may be performed by the media-playback device 102 or the media-delivery system 104 in various embodiments.

At operation 982, a plurality of media content items from a playlist are identified for inclusion in a playlist trailer. As described above, in some embodiments all media content items are included, while in other embodiments only a subset of the media content items is included in the playlist trailer (e.g., based on time constraints). Various techniques for selecting the subset to include in the playlist trailer are described above.

At operation 984, snippets from the identified plurality of media content items are identified. As described above, various techniques can be used to identify snippets of the plurality of media content items for inclusion in the playlist trailer (e.g., the beginning, middle, end, or hook may be selected). The snippets may all have a uniform length or varying lengths depending on the media content item.

At operation 986, the identified snippets are combined to generate a playlist trailer. As described above, in some embodiments the media content for each of the snippets may be concatenated to form a single media content file containing the media content of the playlist trailer. Additionally, in some embodiments, metadata associated with the media content items and the snippets is combined to form the playlist trailer.

In addition to generating a playlist trailer, some embodiments also generate a graphical element corresponding to the playlist trailer. In at least some of these embodiments, graphical elements associated with some or all of the media content items in a playlist are arranged in a mosaic to form the graphical element for the playlist trailer. For example, the graphical element for the playlist trailer may be divided into quadrants, with each quadrant being populated by a graphic element associated with a different media content item from the media content items included in the playlist trailer.

FIG. 20 includes a schematic diagram of a playlist 950 and an associated playlist trailer graphical element 1000. As shown in FIG. 20, the playlist 950 includes media content items 952a, 952b, and 952c through 952n. The playlist trailer graphical element 1000 is generated by arranging graphical elements 1002a, 1002b, 1002c, and 1002n into a mosaic. Other embodiments can combine different numbers of graphical elements to generate the associated playlist trailer graphical element 1000.

In some embodiments, base (or normal mode) user interfaces are provided using a declarative language. The base user interfaces may be stored locally on the media-playback device 102 or may be provided by the media-delivery system 104. Some embodiments perform a method of simplifying these base user interfaces to generate travel mode user interfaces for use during travel. In this manner, a single base user interface can be defined that can be programmatically converted to a travel mode user interface.

An example method for programmatically converting a base user interface can include the step of identifying and removing user interface elements that are smaller than a predetermined threshold. The method can also include removing less necessary controls, which may be identified based on a predefined set of control types, such as controls relating to curating (e.g., generating or editing) playlists may be in this set for removal in travel mode. The based user interface may also include tags that indicate whether the elements are necessary (e.g., an optional tag). The method can also include the step of generating touch targets for the remaining elements that are larger than in the base user interface. The method may also expand the rendering of the remaining element to match the expanded touch targets. Additionally, the method can include the step of generating a default action for touches that are outside of the defined touch targets (e.g., the default action may be skip for a single tap). The base user interface definition may also include information about an appropriate default action.

Here is an example declarative language definition of a portion of a base user interface:

```
<area name="background">
    <button name="button1" size="2">
    <button name="button2" size="5">
    <button name="button3" size="2">
</area>
```

Here is another example declarative language definition of a portion of a base user interface that include tags for use in rendering a travel mode user interface:

```
<area name="background">
    <button name="button1" size="2" importance="low">
    <button name="button2" size="5" importance="high" optional-strike="background">
    <button name="button3" size="2" importance="low">
</area>
```

In some embodiments, when rendering this example user interface in normal mode, the importance and optional-strike tags are ignored, but when rendered in travel mode the tags are used. For example, the elements marked with low importance attributes are not rendered in the travel mode interface, the size of the remaining elements is increased (e.g., from 5 to 7), and an element is selected as the default button for background touches based on the optional-strike attribute.

As noted previously, although many of the examples provided above are described with respect to traveling in a vehicle, other embodiments relate to other forms of travel or even other types of activities in which a user should not be distracted.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

EXAMPLES

In a first example, there is a method of media playback by a media playback device, the method comprising: playing a media content item of a selected playlist of a selected group of playlists; generating a user interface displaying a graphic associated with the media content item that is playing; when a tap input is received at the user interface, playing a next media content item of the selected playlist; when a double tap input is received at the user interface, playing a prior media content item of the selected playlist; when a horizontal swipe input is received at the user interface, playing a media content item of another playlist within the selected group of playlists; and when a vertical swipe input is received at the user interface, playing a media content item of a playlist of a different group of playlists.

In a second example, there is a method of media playback by a media playback device, the method comprising: playing a media content item of a selected playlist of a selected group of playlists; generating a user interface displaying a graphic associated with the media content item that is playing; when an input associated with a first dimension is received into the user interface, playing another media content item of the selected playlist; when an input associated with a second dimension is received into the user interface, playing another media content item of another selected playlist of the selected group of playlists; and when an input associated with a third dimension is received into the user interface, playing another media content item of another selected playlist of another group of playlists.

In a third example, there is a method of media playback by a media playback device, the method comprising: playing a first media content item of a first playlist of a first group of playlists; generating a user interface displaying a graphic associated with the first media content item that is playing; when an input associated with a first dimension is received into the user interface, playing a second media content item of first playlist; when an input associated with a second dimension is received into the user interface, playing a first media content item of a second playlist of the first group of playlists; and when an input associated with a third dimension is received into the user interface, playing a first media content item of a first playlist of a second group of playlists.

In a fourth example, there is a media playback device comprising: an audio output device for media playback; a touch-sensitive display; a processor; and a computer-readable storage device storing data instructions. The instructions, when executed by the processor, cause the processor to: play a media content item through the audio output device, the media content item being in a playlist of a group of playlists; switch to playing a different media content item when a first-dimension input is detected at the touch-sensitive display; switch to playing a different media content item of a different playlist when a second-dimension input is detected at the touch-sensitive display; and switch to playing a different media content item of a different playlist of a different group of playlists when a third-dimension input is detected at the touch-sensitive display.

In a fifth example, there is a method of media playback by a media playback device, the method comprising: playing a media content item of a selected playlist of a selected group of playlists; generating a user interface displaying a graphic associated with the media content item that is playing; when a tap input is received at the user interface, playing a next media content item of the selected playlist; when a double tap input is received at the user interface, playing a prior media content item of the selected playlist; when a horizontal swipe input is received at the user interface, playing a media content item of another playlist within the selected group of playlists; and when a vertical swipe input is received at the user interface, playing a media content item of a playlist of a different group of playlists.

What is claimed is:

1. A device comprising:
a touch-sensitive display;
a processor; and
a non-transitory computer-readable medium comprising instructions that, when executed by the processor, cause the processor to:
play a media content item of a first playlist, wherein the first playlist includes a plurality of media content items;
generate a user interface displaying a graphic associated with the media content item that is playing;
responsive to receiving a swipe input over the touch-sensitive display in a first direction:
select a second playlist, the second playlist having a first media content item and a second media content item;
display a graphic element representing the second playlist as a whole; and
automatically play a first playlist trailer associated with the second playlist,
wherein the first playlist trailer includes a first snippet of the first media content item, the first snippet having a snippet duration of less than a first media content item duration and a second snippet of the second media content item, the second snippet having a second snippet duration less than a second media content item duration; and
wherein the instructions that play the first playlist trailer further cause the processor to:
while playing the first playlist trailer, display a graphic element representing the first playlist trailer in place of the graphic element representing the second playlist as a whole, the graphic element representing the first playlist trailer comprising graphical elements associated with at least the first and second media content items of the second playlist.

2. The device of claim 1, wherein generating the user interface comprises:
representing the media content item that is playing as a media content item card;
representing the first playlist as a stack of media content item cards; and
representing one or more playlists other than the first playlist as one or more playlist cards.

3. The device of claim 1, wherein the instructions when executed by the processor further cause the processor to:
responsive to receiving a tap or double tap input over the touch-sensitive display, play a next media content item or a previous media content item of the first playlist.

4. The device of claim 1, wherein the instructions when executed by the processor further cause the processor to:
responsive to receiving a swipe input over the touch-sensitive display in a second direction, play a second playlist trailer associated with a third playlist, wherein the first playlist and second playlist are associated with a first plurality of playlists and the third playlist is associated with a second plurality of playlists and wherein each playlist in the second plurality of playlists includes a plurality of media content items.

5. The device of claim 1, wherein the instructions when executed by the processor further cause the processor to:
when a confirmatory selection user input is received into the touch-sensitive display while a playlist trailer is playing, play a playlist from the playing playlist trailer.

6. The device of claim 1, wherein the instructions when executed by the processor further cause the processor to:
when a confirmatory selection user input is not received into the touch sensitive display while the first playlist trailer is playing, play the second playlist after playback of the first playlist trailer has concluded.

7. The device of claim 1, wherein the graphic element representing the first playlist trailer comprises a combination of the graphical elements associated with at least the first and second media content items of the second playlist.

8. The device of claim 1, wherein the graphic element representing the first playlist trailer comprises a mosaic of the graphical elements associated with at least the first and second media content items of the second playlist.

9. The device of claim 1, wherein the graphic element representing the first playlist trailer includes an arrangement of graphic elements associated with the media content items of the second playlist.

10. The device of claim 9, wherein the graphic element representing the second playlist as a whole is visually different than the graphic element representing the first playlist trailer.

11. A non-transitory computer-readable medium comprising instructions that, when executed by a processor, cause the processor to:
play a first media content item of a first playlist, wherein the first playlist includes a plurality of media content items;
generate a user interface displaying a graphic associated with the first media content item that is playing;
responsive to an input associated with a first dimension being received into the user interface:
select a second playlist;
display a graphic element representing the second playlist as a whole;
automatically play two or more snippets associated with the second playlist, each snippet corresponding to an associated media content item of the second playlist and having a duration of less than the duration of the associated media content item;
while playing the two or more snippets associated with the second playlist, display a graphic element representing the two or more snippets in place of the graphic element representing the second playlist as a whole, wherein the graphic element representing the two or more snippets has a different visual appearance than the graphic element representing the second playlist as a whole.

12. The non-transitory computer-readable medium of claim 11, wherein the instructions when executed by the processor further cause the processor to:
responsive to an input associated with a depth dimension being received into the user interface, play a second media content item of the first playlist.

13. The non-transitory computer-readable medium of claim 11, wherein the input associated with the depth dimension comprises a tap input, and wherein the second media content item is a next media content item of the first playlist.

14. The non-transitory computer-readable medium of claim 11, wherein the input associated with a depth dimension comprises a double tap input, and wherein the second media content item is a prior media content item of the first playlist.

15. The non-transitory computer-readable medium of claim 11, wherein generating the user interface comprises:

representing the media content item that is playing as a media content item card;

representing the first playlist as a stack of media content item cards; and representing one or more playlists other than the first playlist as one or more playlist cards.

16. The non-transitory computer-readable medium of claim 11, wherein the graphic element representing the two or more snippets includes an arrangement of graphic elements associated with the media content items of the second playlist.

17. The non-transitory computer-readable medium of claim 11, wherein the instructions when executed by the processor further cause the processor to:

responsive to an input associated with a second dimension being received into the user interface, play a media content item associated with a third playlist, wherein the first playlist and second playlist are associated with a first plurality of playlists and the third playlist is associated with a second plurality of playlists and wherein each playlist in the second plurality of playlists includes a plurality of media content items.

18. The non-transitory computer-readable medium of claim 11, wherein the instructions when executed by the processor further cause the processor to:

when a confirmatory selection user input is received into a touch-sensitive display while a snippet of the two or more snippets from the second playlist are playing, playing the second playlist.

19. The non-transitory computer-readable medium of claim 11, wherein the instructions when executed by the processor further cause the processor to:

when the confirmatory selection user input is not received into a touch sensitive display while the snippet of the two or more snippets from the second playlist are playing, playing the second playlist after playback of the two or more snippets from the second playlist has concluded.

20. A method of media playback by a media playback device, the method comprising:

playing a first media content item of a first playlist, wherein the first playlist includes a plurality of media content items;

generating a user interface displaying a graphic associated with the first media content item that is playing;

responsive to receiving an input associated with a first dimension:

selecting a second playlist, the second playlist having two or more media content items;

displaying a graphic element representing the second playlist as a whole;

automatically playing a trailer of the second playlist by playing two or more snippets of the two or more media content items, each snippet corresponding to an associated media content item and having a duration less than the associated media content item;

while playing the trailer, displaying a graphic element representing the trailer in place of the graphic element representing the second playlist as a whole, wherein the graphic element representing the trailer has a different visual appearance than the graphic element representing the second playlist as a whole.

21. The method of claim 20, further comprising:

when a confirmatory selection user input is received into a touch-sensitive display while a playlist trailer is playing, playing a playlist from the playing playlist trailer; and when the confirmatory selection user input is not received into the touch sensitive display while the playlist trailer is playing, play the playlist from the playing playlist trailer after playback of the playing playlist trailer has concluded.

* * * * *